US009807262B2

(12) United States Patent
Ohara et al.

(10) Patent No.: US 9,807,262 B2
(45) Date of Patent: Oct. 31, 2017

(54) RELAYING APPARATUS COMMUNICATING WITH INFORMATION PROCESSING TERMINAL, IMAGE PROCESSING APPARATUS, AND SERVICE-PROVIDING APPARATUS

(71) Applicant: Brother Kogyo Kabushiki Kaisha, Nagoya-shi, Aichi-ken (JP)

(72) Inventors: Kiyotaka Ohara, Nagoya (JP); Masafumi Miyazawa, Nagoya (JP); Satoshi Watanabe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/200,462

(22) Filed: Jul. 1, 2016

(65) Prior Publication Data
US 2017/0094078 A1 Mar. 30, 2017

(30) Foreign Application Priority Data
Sep. 30, 2015 (JP) .................................. 2015-195471

(51) Int. Cl.
*H04N 1/00* (2006.01)
*H04N 1/32* (2006.01)
(Continued)

(52) U.S. Cl.
CPC ....... *H04N 1/00344* (2013.01); *G06K 15/402* (2013.01); *H04N 1/00007* (2013.01);
(Continued)

(58) Field of Classification Search
None
See application file for complete search history.

(56) References Cited

U.S. PATENT DOCUMENTS 9,049,332 B2 * 6/2015 Igarashi ............ H04N 1/00344
358/1.15
2008/0126228 A1 5/2008 Nagai et al.
(Continued)

FOREIGN PATENT DOCUMENTS

JP 2004-236105 A 8/2004
JP 2008-159022 A 7/2008

*Primary Examiner* — Beniyam Menberu
(74) *Attorney, Agent, or Firm* — Banner & Witcoff, Ltd.

(57) ABSTRACT

In a relaying apparatus, a storage stores a plurality of sets of first device information, and second device information assigned to a first set of first device information identifying one image processing apparatus from among image processing apparatuses. The controller communicates with the one image processing apparatus and a service-providing apparatus. The controller receives replacement request information from the one information processing terminal via the communication interface. The replacement request information including old first device information and new first device information. The old first device information indicates the one image processing apparatus. The new first device information indicates another image processing apparatus. The controller replaces the first set of first device information so that the first set of first device information identifies the another image processing apparatus indicated by the new first device information instead of the one image processing apparatus indicated by the old first device information.

11 Claims, 12 Drawing Sheets

(51) Int. Cl.
  *G06K 15/02* (2006.01)
  *G06F 3/12* (2006.01)
  *G06K 15/00* (2006.01)

(52) U.S. Cl.
  CPC ..... *H04N 1/00042* (2013.01); *H04N 1/00058* (2013.01); *H04N 1/32101* (2013.01); *H04N 2201/0094* (2013.01)

(56) References Cited

U.S. PATENT DOCUMENTS

| | | | | |
|---|---|---|---|---|
| 2010/0191813 | A1* | 7/2010 | Gandhewar | H04L 61/2015 709/206 |
| 2013/0070780 | A1* | 3/2013 | Hozumi | H04B 7/15542 370/437 |
| 2013/0110994 | A1* | 5/2013 | Kang | H04L 12/6418 709/220 |

* cited by examiner

FIG. 4 (A)

ACCOUNT LIST

| ACCOUNT ID | 001 | 999 | . . . . |
|---|---|---|---|
| FIRST ACCOUNT ID | USER A | ADMINISTRATOR | . . . . |
| SESSION ID | — | — | . . . . |
| PIN | 012 | — | . . . . |
| USER INFORMATION | * * * | — | . . . . |

FIG. 4 (B)

DEVICE LIST

| FIRST DEVICE ID | abc | def | . . . . |
|---|---|---|---|
| SECOND DEVICE ID | α | β | . . . . |
| DEVICE NAME | PRINTER 1 | PRINTER 2 | . . . . |
| MODEL NAME | MFP-A | MFP-B | . . . . |
| FIRST TOKEN | 0x71C0 | 0xE38A | . . . . |
| CONNECTION INFORMATION | 51364 | DISCONNECT | . . . . |
| ACCOUNT ID | 001 | 001 | . . . . |

FIG. 4 (C)

SERVICE LIST

| SECOND DEVICE ID | β | . . . |
|---|---|---|
| SERVICE ID | SERVICE B | . . . |
| SECOND TOKEN | 0x1B04 | . . . |

FIG. 11 (A)

| SERVICE APPLICATION PAGE | | | |
|---|---|---|---|
| DEVICE NAME | MODEL NAME | SERVICE A | SERVICE B |
| PRINTER 1 | MFP-A | (APPLICATION) | (UNSUPPORTED) — 136 |
| PRINTER 2 | MFP-B | (APPLICATION) | (APPLIED) — 138 |

DEVICE SELECTION PAGE

| OLD | NEW | DEVICE NAME | MODEL NAME | USING SERVICE | CONNECTION STATUS |
|---|---|---|---|---|---|
| ○ | ○ | PRINTER 1 | MFP-A | A | CONNECT |
| ⦿ | ○ | PRINTER 2 | MFP-B | B | DISCONNECT |
| ○ | ⦿ | PRINTER 3 | MFP-B | — | DISCONNECT |

(REPLACE)　(CANCEL)

141　142

RELAYING APPARATUS COMMUNICATING WITH INFORMATION PROCESSING TERMINAL, IMAGE PROCESSING APPARATUS, AND SERVICE-PROVIDING APPARATUS

CROSS REFERENCE TO RELATED APPLICATION

This application claims priority from Japanese Patent Application No. 2015-195471 filed Sep. 30, 2015. The entire content of the priority application is incorporated herein by reference.

TECHNICAL FIELD

The present disclosure relates to a relaying apparatus for relaying a data communication between an image processing apparatus and a service providing apparatus.

BACKGROUND

A conventional system includes a monitoring apparatus and an ordering support apparatus. The monitoring apparatus monitors status of consumables in apparatuses. The ordering support apparatus sends an email having a URL showing a web page for the order of the consumables in response to a notification indicating shortage of a consumable from the monitoring apparatus.

SUMMARY

It is conceivable that both the monitoring apparatus and the ordering support apparatus manage device IDs for identifying apparatuses subject for the consumable-ordering support. In this case, if an apparatus subject for monitoring is changed to new one due to failures of the old apparatus, it is required to change both device ID managed in the monitoring apparatus and device ID managed in the ordering support apparatus.

In view of the foregoing, it is an object of the present disclosure to provide a relaying apparatus that relays a communication between an image processing apparatus and a service-providing apparatus without sending change of device information with respect to the image processing apparatus to the service-providing apparatus.

In order to attain the above and other objects, the disclosure provides a relaying apparatus. The relaying apparatus includes a communication interface, a storage, and a controller. The communication interface is configured to communicate with an information processing terminal, a plurality of image processing apparatuses configured to process images, and a service-providing apparatus configured to provide a service available for a user of each of the plurality of image processing apparatuses. The storage stores a plurality of sets of first device information respectively identifying the plurality of image processing apparatuses, and second device information assigned to a first set of first device information from among the plurality of sets of first device information. The first set of first device information identifies one image processing apparatus from among the plurality of image processing apparatuses. The controller is configured to: communicate with the one image processing apparatus via the communication interface so as to transmit and receive first service use information, the first service use information being for using the service provided by the service-providing apparatus; communicate with the service-providing apparatus so as to transmit and receive second service use information via the communication interface, the second service use information including the second device information stored in the storage in association with the first set of first device information; receive replacement request information from the one information processing terminal via the communication interface, the replacement request information including old first device information and new first device information, the old first device information indicating the one image processing apparatus, the new first device information indicating another image processing apparatus other than the one image processing apparatus; and replace the first set of first device information so that the first set of first device information identifies the another image processing apparatus indicated by the new first device information instead of the one image processing apparatus indicated by the old first device information.

According to another aspects, the disclosure provides a system. The system includes a relaying apparatus, an information processing terminal, and a plurality of image processing apparatuses. The relaying apparatus includes a first communication interface, a storage, and a first controller. The first communication interface is configured to communicate with the information processing terminal, the plurality of image processing apparatuses, and the service-providing apparatus configured to provide a service available for a user of each of the plurality of image processing apparatuses. The storage stores a plurality of sets of first device information respectively identifying the plurality of image processing apparatuses, and second device information assigned to a first set of first device information from among the plurality of sets of first device information. The first set of first device information identifies one image processing apparatus from among the plurality of image processing apparatuses. The first controller is configured to: communicate with the one image processing apparatus via the first communication interface so as to transmit and receive first service use information, the first service use information being for using the service provided by the service-providing apparatus; communicate with the service-providing apparatus so as to transmit and receive second service use information via the first communication interface, the second service use information including the second device information stored in the storage in association with the first set of first device information; receive replacement request information from the one information processing terminal via the first communication interface, the replacement request information including old first device information and new first device information, the old first device information indicating the one image processing apparatus, the new first device information indicating another image processing apparatus other than the one image processing apparatus; and replace the first set of first device information so that the first set of first device information identifies the another image processing apparatus indicated by the new first device information instead of the one image processing apparatus indicated by the old first device information. The one image processing apparatus includes an image processor, a second communication interface, and a second controller. The image processor is configured to process an image. The second communication interface is configured to communicate with the relaying apparatus. The second controller is configured to communicate with the relaying apparatus via the second communication interface to transmit and receive the first service use information. The information processing terminal includes a third communication interface and a third controller. The third communication interface is configured to communicate with the relaying apparatus. The third controller is configured to transmit the replacement request information to the relaying apparatus via the third communication interface.

BRIEF DESCRIPTION OF THE DRAWINGS

The particular features and advantages of the disclosure as well as other objects will become apparent from the following description taken in connection with the accompanying drawings, in which:

FIG. 4(A) is an example of an account list stored in a storage of the relaying apparatus;

FIG. 4(B) is an example of a device list stored in the storage of the relaying apparatus;

FIG. 4(C) is an example of a service list stored in the storage of the relaying apparatus;

FIG. 11(A) is an example of a service application page displayed on the display of the information processing terminal;

FIG. 11(B) is an example of a device selection page displayed on the display of the information processing terminal.

DETAILED DESCRIPTION

Figure 1:
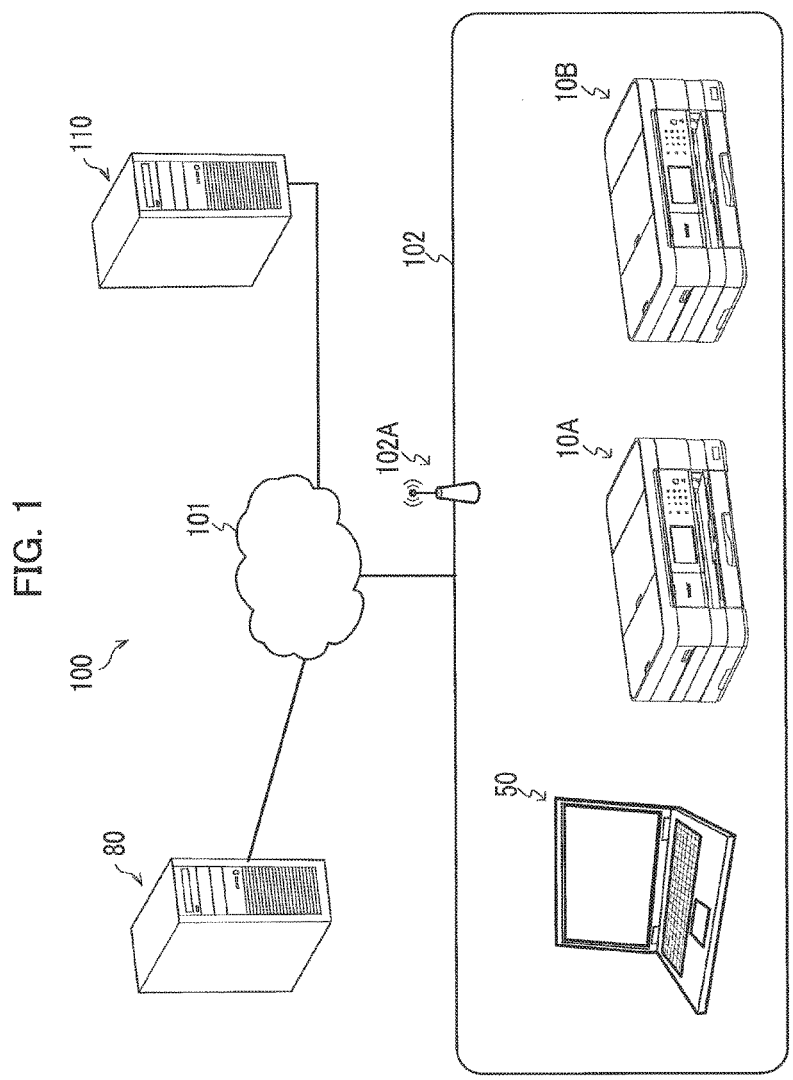
FIG. 1 is a schematic diagram showing a communication system according to an embodiment.

A communication system according to an embodiment will be described while referring to the accompanying drawings wherein like parts and components are designated by the same reference numerals to avoid duplicating description. It would be apparent to those skilled in the art that various changes and modifications may be made therein without departing from the scope of the disclosure.

FIG. 1 is a schematic diagram showing a communication system 100 according to the embodiment. The communication system 100 shown in FIG. 1 includes a multifunction peripherals 10A and 10B (hereinafter, multifunction peripheral 10 is the general term for the multifunction peripherals 10A and 10B), an information processing terminal 50, and a relaying apparatus 80. The communication system 100 allows a user of the multifunction peripheral 10 to use a service provided by a service-providing apparatus 110. The multifunction peripheral 10, the information processing terminal 50, the relaying apparatus 80, and the service-providing apparatus 110 can communicate with each other over a communication network. While there are no particular limitations on the structure of the communication network, the network may be the Internet, a wired local area network (LAN), a wireless LAN 102, or a combination of these.

The multifunction peripheral 10 and the information processing terminal 50 belong to the wireless LAN 102. The wireless LAN 102 is connected to the Internet 101 via a router 102A. The relaying apparatus 80 and the service-providing apparatus 110 is connected to the Internet 101. The multifunction peripheral 10 and the information processing terminal 50 can communicate with the relaying apparatus 80 and the service-providing apparatus 110 via the router 102A and the Internet 101. The multifunction peripheral 10 and the information processing terminal 50 may belong to networks different from each other.

The router 102A functions as a wireless LAN access point, for example. The multifunction peripheral 10 and the information processing terminal 50 are connected to ports of the router 102A at the wireless LAN 102 side according to connection procedures of the wireless LAN. The router 102A relays the communication between apparatuses connected thereto according to the connection procedures of the wireless LAN. In other words, belonging to the wireless LAN 102 is a state of connection with the router 102A according to the procedures of the wireless LAN.

Figure 2:
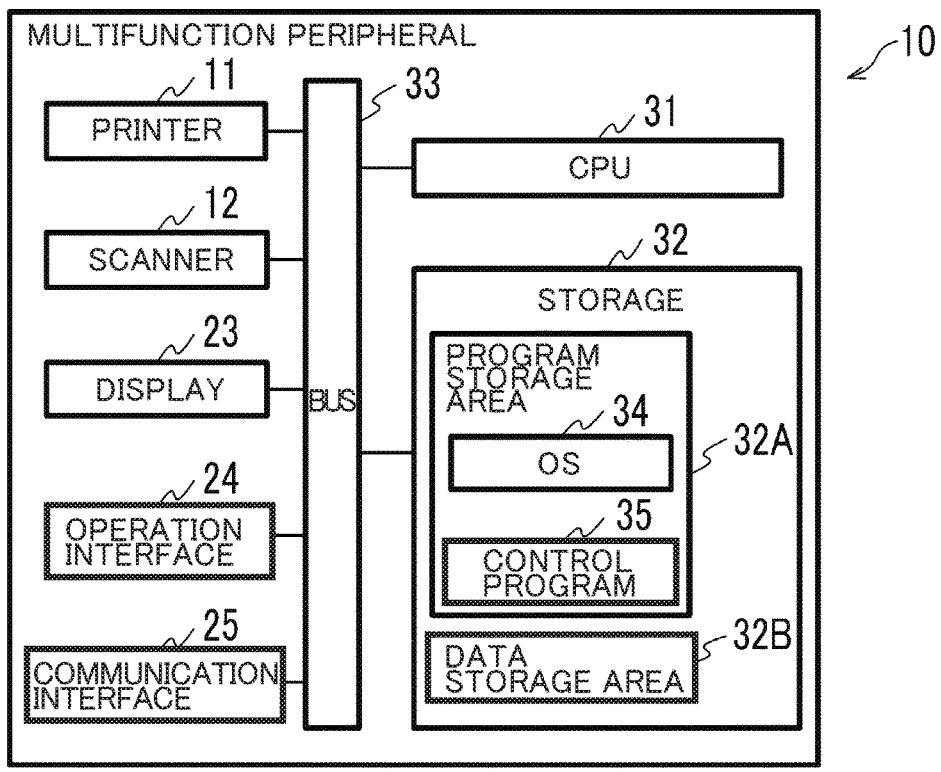
FIG. 2(A) is a block diagram illustrating an electrical structure of a multifunction peripheral according to the embodiment.
FIG. 2(B) is a block diagram illustrating an electrical structure of an information processing terminal according to the embodiment.
Figure 2:
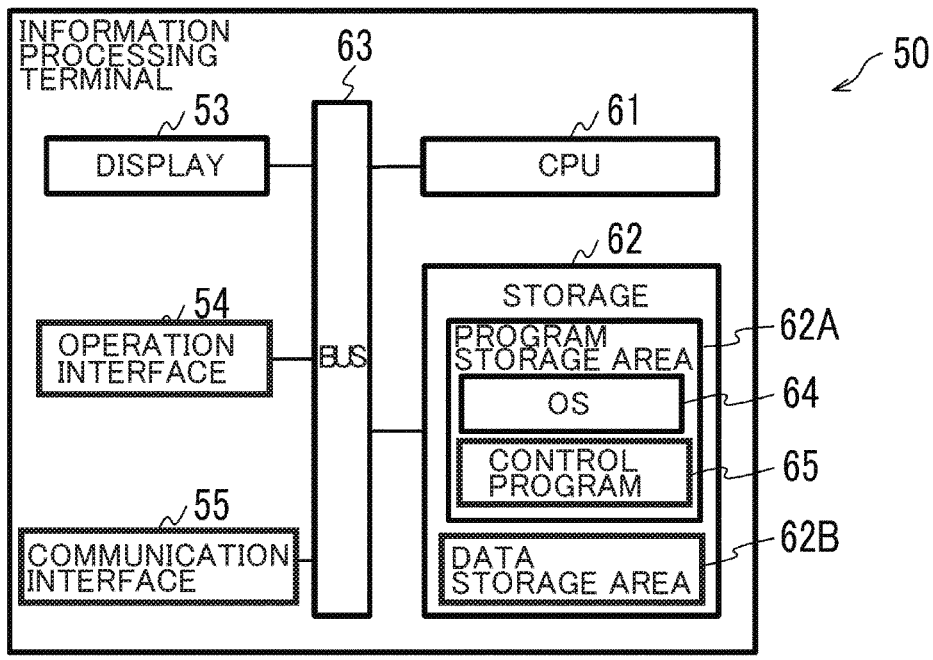

Local IP addresses are assigned to each port of the router 102A on the wireless LAN 102 side, a communication interface 25 (FIG. 2) in each of the multifunction peripherals 10A and 10B, and a communication interface 55 (FIG. 2) in the information processing terminal 50. Hence, the router 102A functions as the access point of the wireless LAN. On the other hand, a global IP Address is assigned to each of the port of the router 102A on the internet 101 side, a communication interface 85 (FIG. 2) in the relaying apparatus 80, and the service-providing apparatus 110 Thus, the router 102A functions as a firewall.

More specifically, the router 102A relays requests transmitted from the multifunction peripheral 10 to the relaying apparatus 80 and responses to requests transmitted from the relaying apparatus 80 to the multifunction peripheral 10. However, the router 102A denies requests transmitted from the relaying apparatus 80 to the multifunction peripherals 10. The router 102A implements the same functions for communications between any multifunction peripheral 10 and the service-providing apparatus 110, communications between the information processing terminal 50 and the relaying apparatus 80 or the service-providing apparatus 110. Thus, the multifunction peripherals 10A and 10B and the information processing terminal 50 belong to a network protected by a firewall and communicate with the relaying apparatus 80 and the service-providing apparatus 110 through the firewall.

Multifunction Peripheral 10

As shown in FIG. 2(A), the multifunction peripheral 10 primarily includes a printer 11, a scanner 12, a display 23, an operation interface 24, a communication interface 25, a CPU 31, and a storage 32, all of which are interconnected via a communication bus 33. The multifunction peripheral 10 is an example of the image processing apparatus. The printer 11 and the scanner 12 are examples of the image processor that form images on printing media. The communication interface 25 is an example of the second communication interface.

Printer 11 and Scanner 12

The printer 11 executes a printing process to record an image specified by image data on recording paper. The method of recording employed by the printer 11 may be any well-known method, such as an inkjet method and electro-photographic method. The scanner 12 executes a scanning process to read an image recorded on a recording paper and to generate image data. The printer 11 is an example of a recorder and the scanner 12 is an example of the reader. The multifunction peripheral 10 may include a facsimile function for transmitting and receiving facsimile data and a copying function for reading an image recorded on recording sheet and recording this image on another sheet of recording paper.

Display 23

The display 23 includes a display screen for displaying various information. The display 23 may be configured of a liquid crystal display (LCD) or an organic electro-luminescence display (organic EL display), for example.

Operation Interface 24

The operation interface 24 receives operations from the user when the user selects objects displayed on the display screen of the display 23. More specifically, the operation interface 24 has buttons and outputs various operating signals to the CPU 31 corresponding to buttons that have been pressed. The operation interface 24 may also include a film-like touch sensor laid over the display screen of the display 23. In other words, the display 23 may be configured as a touchscreen display. Note that the term "object" used in this description denotes an image that the user can select by operating the operation interface 24. Example of an object is a character string, icons, buttons, and links displayed on the display 23.

The operation interface 24 in the embodiment is implemented as a touchscreen that receives operations in the form of the user touching the display screen of the display unit 23. The operation interface 24 implemented as a touchscreen outputs an user's touch operation (or detection of the touch operation) and position information indicating positions on the display screen that the user touched. The position information can be expressed as coordinates (x, y) in an xy plane. The touch sensors of the operation interface 24 may be configured to use any well-known method, such as electrostatic capacitive method or an electrically resistive film method.

Note that the term "touch" in this specification in general includes any operation for contacting the display screen with an input medium. In the specification, a tap operation in which the touching input medium is separated from the display screen within a prescribed time period is an example of "touch". However, examples of touching may be a long touch operation, a slide operation, a flick operation, a pinch-in operation, or a pinch-out operation. Further, the action of bringing the input medium to a position only slightly separated from the display screen while not touching the same may also fall under the concept of "touch" described above. Further, the input medium may be the user's finger, a stylus, or the like.

Communication Interface 25

The communication interface 25 is an interface for implementing communications with external apparatuses. More specifically, the communication interface 25 can communicate with the information processing terminal 50, the relaying apparatus 80, and the service-providing apparatus 110. The communication interface 25 uses a communication method that conforms to the IEEE 802.11 standard, or Wi-Fi (registered trademark of Wi-Fi Alliance) for example.

CPU 31

The CPU (central processing unit) 31 functions to control all operations of the multifunction peripheral 10. The CPU 31 acquires various programs described later from the storage 32 and executes the programs on the basis of various information outputted from the operation interface 24 and various information and the like acquired from external apparatuses via the communication interface 25. The CPU 31 and the storage 32 are examples of the second controller.

Storage 32

The storage 32 has a program storage area 32A, and a data storage area 32B. The program storage area 32A stores an operating system (OS) 34, and a control program 35. The OS 34 and the control program 35 are programs built in binary format. The control program 35 may be a single program or an aggregate of programs. The data storage area 32B stores data or information required to execute the control program 35.

Note that the terms "data" and "information" in the following descriptions used share aspects of being bits or bit strings that computers can handle. The computer treats "data" without considering the significance of its individual bits. In the case of "information," on the other hand, the computer's operations branch based on the significance of the individual bits. Additionally, an "instruction" is a control signal prompting the destination apparatus to perform the next operation. An instruction may include information and may itself possess the properties of information.

Further, data and information are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between data and information is not strictly enforced; exceptions to the rule may be allowed. For example, data may be temporarily treated as information, while information may be temporarily treated as data. Further, certain bits or bit strings may be treated as data on one apparatus and treated as information on another. Further, information may be extracted from data, and data may be extracted from information.

The storage 32 is configured of random access memory (RAM), read-only memory (ROM), electrically erasable programmable read-only memory (EEPROM), a hard disk drive (HDD), a buffer provided in the CPU 31, or a combination of these, for example.

Note that the storage 32 may be any storage medium that can be read by a computer. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The CPU 31 executes programs stored in the program storage area 32A. However, the following descriptions may omit the CPU 31 when describing operations of the programs. In other words, the phrasing "Program A executes Process A" in the following description may be used to signify that "the CPU 31 executes Process A described in Program A." The same holds true for programs executed on the relaying apparatus 80 and the service-providing apparatus 110, described later.

The programs stored in the program storage area 32A determine the results of events and execute operations based on these results. However, this specification will omit a description of such determinations and will merely describe the operations of each program. Thus, the expression in the following description "the control program executes Process A in response to Condition A" will be used to denote the meaning "the control program determines whether Condition A has been met and executes Process A in response to a positive determination that Condition A has been met."

Further, the programs stored in the program storage area 32A identify, extract, or select data and the like. Here, the identification of data and the like denotes a process in which the program identifies data from a plurality of data sets that matches a condition, and stores the data and the like itself or information identifying the data and the like in a predetermined storage area. Here, information identifying data and the like may be identification information for identifying the data and the like, an index of an array in which the data and the like is stored, or a pointer for a storage area in which the data and the like are stored, for example. The programs perform similar processes for extracting or selecting data and the like.

Further, the programs stored in the program storage area 32A acquire data and the like. For example, the acquisition of data and the like may denote a process in which a program reads data from the storage area in which the data is stored; a process in which the program receives data transmitted from an external apparatus; a process in which the program requests the transmission of data from an external apparatus and receives the data transmitted from the external apparatus; a process in which the program receives data outputted from the OS or other program; or a process in which the program requests the output of data from another program and receives the data outputted from the other program.

The OS 34 is the underlying software that provides an application programming interface (API) for controlling the hardware constituting the multifunction peripheral 10, including the printer 11, the scanner 12, the display 23, the operating interface 24, and the communication interface 25. Hence, the programs described above control the hardware of the multifunction peripheral 10 by calling the API provided in the OS 34. However, the role of the OS 34 will not be included in a description of operations performed by the programs in this specification. Thus, the phrase "Program B controls Hardware C" in the following description may be used to signify that "Program B controls Hardware C through the API of the OS 34."

Note that the above description for basic operations of programs is similarly applicable to programs stored in the program storage areas 62A of the information processing terminal 50 and the program storage area 92A of the relaying apparatus 80, described later and is not merely limited to programs stored in the program storage area 32A.

While omitted from the drawings, the multifunction peripheral 10 also stores various device-related information. This information includes the serial number, first device ID, device name, and model name of the multifunction peripheral 10, for example. This information may also be dispersed among and stored in a control board, a management information base (MIB), or the data storage area 32B of the multifunction peripheral 10, for example.

The serial number is a unique number assigned to each multifunction peripheral 10 by the manufacturer. The first device ID is unique information assigned to each individual multifunction peripherals 10A and 10B and is an example of the first device information. The first device ID may be generated on the basis of information stored on the control board mounted in the individual multifunction peripherals 10A and 10B, for example. Specifically, the first device ID is generated using MAC (Media Access Control) address assigned to the communication interface 25 of the multifunction peripheral 10. If a control board of the multifunction peripheral 10 is replaced, the first device ID of the multifunction peripheral 10 is changed.

The device name is a name of the multifunction peripheral 10 discriminated by the corresponding first device ID. The device name may be preassigned with the multifunction peripheral 10, or may be assigned by a user of the multifunction peripheral 10. The model name is a model name of the multifunction peripheral 10 discriminated by the corresponding first device ID. For example, the model name is used for judging how functions the multifunction peripheral 10 has. The model name is preassigned with the multifunction peripheral 10.

In the embodiment, the multifunction peripheral 10A stores, as device information, a first device ID "abc", a device name "printer 1", and a model name "MFP-A". The multifunction peripheral 10B stores, as device information, a first device ID "def", a device name "printer 2", and a model name "MFP-B". In the embodiment, an detailed explanation of serial numbers are omitted.

Information Processing Terminal 50

As shown in FIG. 2(B), the information processing terminal 50 has a display 53, an operation interface 54, a communication interface 55, a CPU 61, a storage 62, and a communication bus 63. The CPU 61 and the storage 62 constitute an example of a third controller. The display 53, the operation interface 54, the communication interface 55, the CPU 61, the storage 62, and the communication bus 63 are respectively equivalent to the display 23, the operation interface 24, the communication interface 25, the CPU 31, the storage 32, and the communication bus 33 and, hence, a detailed description of these components will not be repeated. The information processing terminal 50 may be a cellular phone, a smartphone, a tablet terminal, or a personal computer (PC), for example. The control program 65 is a browser program, for example.

Relaying Apparatus 80

Figure 3:
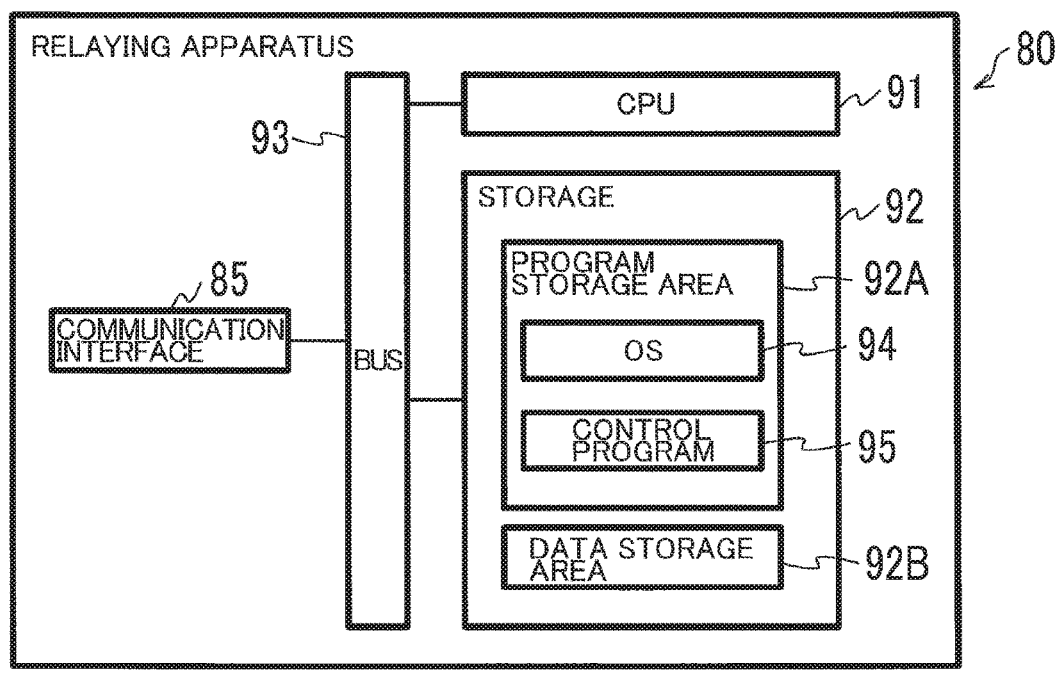
FIG. 3 is a block diagram illustrating an electrical structure of a relaying apparatus according to the embodiment.

As shown in FIG. 3, the relaying apparatus 80 has a communication interface 85, a CPU 91, a storage 92, and a communication bus 93. The CPU 91 and the storage 92 constitute a first controller. The communication interface 85 is an example of a first communication interface. The communication interface 85, the CPU 91, the storage 92, and the communication bus 93 are respectively equivalent to the communication interface 25, the CPU 31, the storage 32, and the communication bus 33 and, hence, a detailed description of these components will not be repeated.

As shown in FIG. 4(A), the data storage area 92B can store an account list. The account list can register a plurality of account records. In each account record, an account ID, a first account information, a session ID, a PIN (Personal Identification Number), and a user information are associated with one another.

The account ID is an example of account identification information for identifying a user of the multifunction peripheral 10 identified by the corresponding user information. The account record is uniquely identified by the account ID. The first account information is issued by the relaying apparatus 80 to the user of the multifunction peripheral 10 and information processing terminal 50 for indicating possession of authority to perform communications between the information processing terminal 50 and the relaying apparatus 80. The first account information may be a combination of a user ID and a password, for example.

The session ID is an example of an account specification information assigned to the account ID. The session ID is for identifying whether a plurality of communications between the information processing terminal 50 and the relaying apparatus 80 is a series of communications. The session ID is issued by the relaying apparatus 80 when a login process described later is performed, and the session ID is transmitted to the information processing terminal 50. The information processing terminal 50 temporarily stores the received session ID in the data storage area 62B and adds the session ID to information that will be transmitted to the relaying apparatus 80. In place of or in addition to the session ID, a token issued by the relaying apparatus 80 may be added to the information that will be transmitted to the relaying apparatus 80 from the information processing terminal 50. There is a case where the session ID may be deleted from the data storage area 92B (the account list) after a prescribed time period is elapsed from a time at which the session ID is issued by the relaying apparatus 80. The PIN is an example of temporary identification information issued by the relaying apparatus 80 in response to a request from the information processing terminal 50 that is in the login state. For example, the PIN is a character string or a numeric string that a user of the information processing terminal 50 can recognize. The user information is for specifying a user assigned to corresponding first account information.

The user information can include arbitral information such as, a name, an address, a telephone number, a credit card number of the user. The relaying apparatus 80 transmits, to the information processing terminal 50, an HTML file defining a page for receiving input of the user information, and receive the user information inputted via the page from the information processing terminal 50. Subsequently, the relaying apparatus 80 issues the account ID and the first account information correlated with the user information. The relaying apparatus 80 registers an account record including the issued account ID, the issued first account information, and the user information obtained by the information processing terminal 50. The relaying apparatus 80 transmits the issued first account information to the information processing terminal 50. These processes are executed before operations shown in FIGS. 5-8 described later.

In the embodiment, the first account information "user A" is issued for the user possessing the multifunction peripherals 10A and 10B and the information processing terminal 50. The account list may include an account record including a first account information "administrator" that is issued for a service man of a manufacturer of the multifunction peripheral 10. While the information processing terminal 50 is logged on the relaying apparatus 80 using the first account information, the information processing terminal 50 can allow the relaying apparatus 80 to perform a special process that is not allowed for the information processing terminal 50 that logged on the relaying apparatus 80 using a first account information issued for a normal user. The detailed explanation will be made later.

As shown in FIG. 4(B), the data storage area 92B can store a device list. The device list can register a plurality of device records. In each device record, a first device ID, a second device ID, a device name, a model name, a first token, connection information, and an account ID are associated with one another.

The first device ID, the device name, and the model name are included in device information of each of the multifunction peripherals 10A and 10B. The device record is uniquely identified by the first device ID. The second device ID is issued by the relaying apparatus 80 for identifying one of the multifunction peripherals 10A and 10B. The second device ID is an example of second device information. The second device ID may be arbitrary type if only the second device IDs are in one-to-one correspondence with the first device IDs. The second device ID may be a character string. When the first device ID corresponds to the second device ID, both the first and second device IDs identify the same multifunction peripheral 10. The first token is issued by the relaying apparatus 80 for indicating possession of authority to perform communication processes S72, S77, and S82 described later. The first token is an example of first authentication information. The first authentication information is binary data, for example.

The connection information is for identifying connection established between the relaying apparatus 80 and the multifunction peripheral 10 for performing the first communication processes S72, S77, and S82. Specifically, the connection information is for identifying XMPP (Extensible Messaging and Presence Protocol) connection established between the multifunction peripheral 10 and the relaying apparatus 80. In a case where the communication interface 85 performs communication according to TCP/IP (Transmission Control Protocol/Internet Protocol), the connection information includes IP address of the transmission source and a port number of the transmission source. Here, the IP address of the transmission source is included in IP header of XMPP connection permission information and the port number of the transmission source is included in TCP header of the XMPP connection permission information. In a case where XMPP connection is not established, the connection information is set to "Disconnect".

The account ID in the device record is the same as the account ID included in the account record. That is, the device record is correlated to the account record by the account ID. The device record includes information of the multifunction peripheral 10 possessed by a user identified by the account ID. That is, a plurality of device records are assigned to an account record of a user who has a plurality of multifunction peripherals 10. A process to store a device record assigned to the account record will be described later.

As shown in FIG. 4(C), the data storage area 92B can store a service list. The service list can register a plurality of service records. In each of the plurality of service records, a second device ID, a service ID and a second token are assigned with one another.

The second device ID of the service record is the same as the second device ID included in the device record. The service ID is for identifying a service that the service-providing apparatus 110 provides. The service ID is one example of service identification information. The service record is uniquely identified by a combination of the second device ID and the service ID. The second token is issued by the service-providing apparatus 110 for showing possession of authority to perform communication processes S75 and S80 described later. The second token is one example of second authentication information. The second token is binary data for example.

The service record is correlated to the device record by the second device ID. The service record includes information showing an available service through the multifunction peripheral 10 that is identified second device ID. That is, a plurality of service records can be assigned to the device record of the multifunction peripheral 10 that can use a plurality of services. A process to store the service record in association with the service record will be described later.

Though not shown in the drawings, the data storage area 92B stores the model name of the multifunction peripheral 10 and the service ID in association with each other. The service ID shows a service available through the multifunction peripheral 10 having a corresponding model name. That is, one model name is in association with one or more service IDs. For example, the administrator of the relaying apparatus 80 registers the information described above. In the embodiment, a service ID "service A" is assigned to a model name "MFP-A" of the multifunction peripheral 10A, and service IDs "service A" and "service B" are assigned to a model name "MFP-B" of the multifunction peripheral 10B.

Service-Providing Apparatus 110

The service-providing apparatus 110 supplies services available for the user of the multifunction peripheral 10. The service-providing apparatus 110 is on the Internet and supplies services in response to requests from the multifunction peripheral 10, the information processing terminal 50, or the relaying apparatus 80. The service-providing apparatus 110 may be supply a single service or a plurality of services. The service that the service-providing apparatus 110 supplies is identified by the service ID.

The service-providing apparatus 110 according to the embodiment provides a translation service, for example. More specifically, the service-providing apparatus 110 receives scan data generated by the scanner 12 from the multifunction peripheral 10 and converts the character string of a first language (English, for example) included in the scan data to a character string in a second language (Japanese, for example) having essentially the same content. The converted data that includes the character string in the second language will be called "translated data." The service-providing apparatus 110 then instructs the multifunction peripheral 10 to print the translated data. This translation service may be configured of a plurality of services. For example, some possible services are a service instructing the user to upload image data including the desired character string to be translated, and a service instructing the user to download the translated data. The service ID for this translation service in the embodiment is "Service A."

The services provided by the service-providing apparatus 110 are not limited to the above example. The service-providing apparatus 110 may provide a service for managing the status of multifunction peripherals 10, a service that allows the user to view the status of multifunction peripherals 10 via the information processing terminal 50, a service that sends reports to the user of a multifunction peripheral 10 specifying the status of the multifunction peripheral 10, a service that controls the multifunction peripherals 10 to execute printing operations on news image data that includes desired news, and a service for delivering supplies required for using the multifunction peripheral 10 to the user of the same, for example.

Though not shown in the drawings, the service-providing apparatus 110 stores second account information, user information, a second device ID, a service ID, and a second token in association with one another. The second account information is issued by the service-providing apparatus 110 to the user of the multifunction peripheral 10 for indicating possession of authority to perform communications between the multifunction peripheral 10 and the service-providing apparatus 110. The second account information may be a combination of a user ID and a password, for example. The user information may include arbitrary information, such as, a name, an address, a telephone number, a credit card number of the user. The second device ID is issued by the relaying apparatus 80. That is, the second device ID is managed by both the relaying apparatus 80 and the service-providing apparatus 110.

A process of the service-providing apparatus 110 for issuing second account information in response to acquisition of the user information may basically be the same as a process of the relaying apparatus 80 for issuing the first account information in response to acquisition of the user information. In this case, items of the user information maintained by the relaying apparatus 80 may be the same with or different from items of the user information maintained by the service-providing apparatus 110. The associated second device ID, service ID and second token are the same as those registered in the service record. A process for storing the second device ID, the service ID, and the second token associated with one another may be described later.

The service-providing apparatus 110 uses the above described information when providing services to the user or when billing the user for the services provided, for example. As a specific example, the service-providing apparatus 110 may send reports or supplies to the address associated with the second device ID on the basis of information collected from the multifunction peripheral 10 identified by the second device ID via the relaying apparatus 80. As another example, the service-providing apparatus 110 may complete a payment transaction using the credit card associated with the second device ID for the cost of services provided through the multifunction peripheral 10 associated with the second device ID.

Operations of the Communication System 100

The operations of the communication system 100 according to the embodiment will be described with reference to FIGS. 5 through 12. The description of the embodiment focuses on processes performed by the relaying apparatus 80 for enabling the user of the multifunction peripheral 10 to access services provided by the service-providing apparatus 110. In the embodiment, the same user possesses the multifunction peripherals 10A and 10B and the information processing terminal 50.

Figure 5:
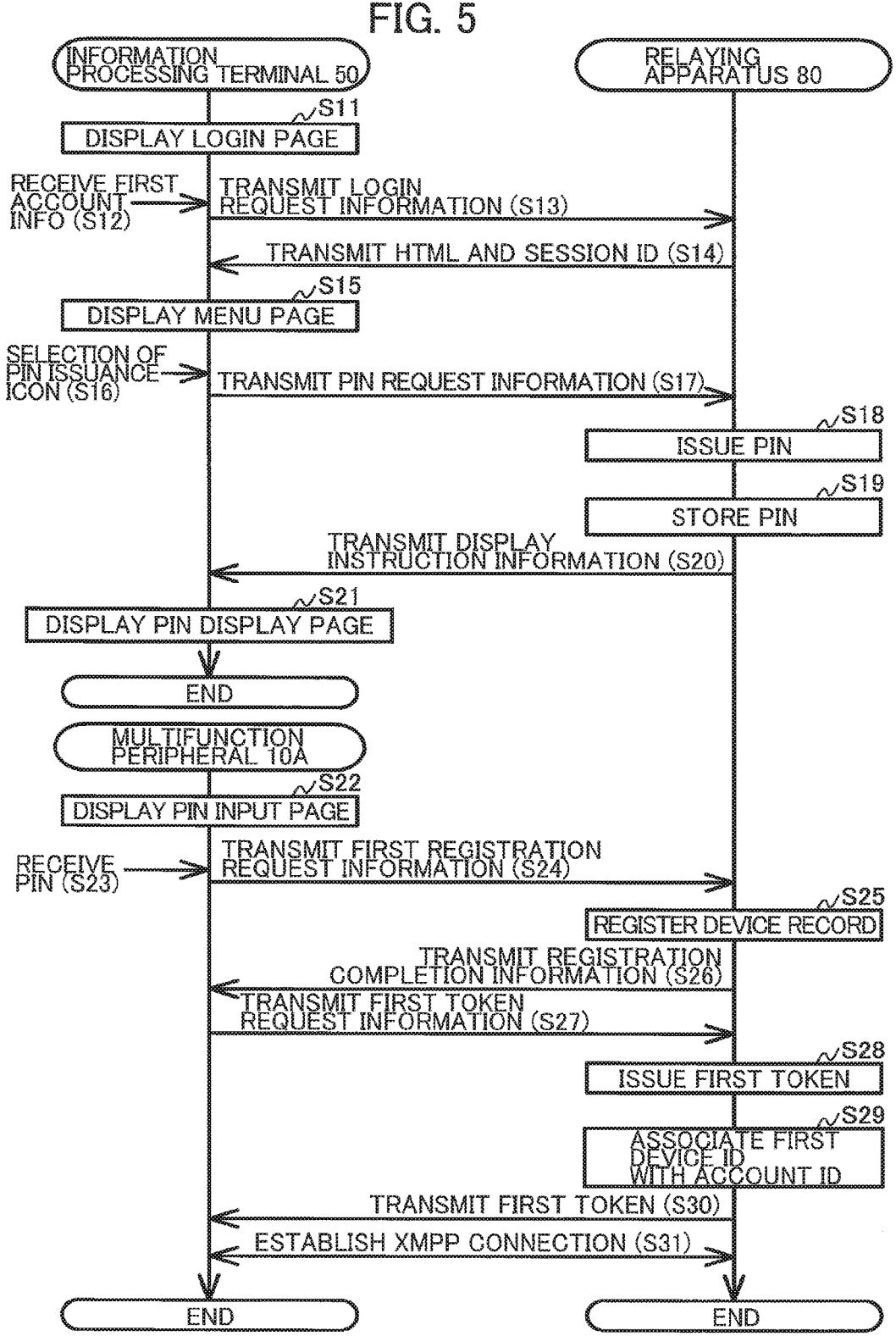
FIG. 5 is a flowchart illustrating a process for registering a device record to the relaying apparatus.

FIG. 5 shows a process for registering the device record with respect to the multifunction peripheral 10A (FIG. 4(B)) in the relaying apparatus 80. In S11, the control program 65 of the information processing terminal 50 displays a login page in the display 53. The login page displayed in S11 is used to receive input of the first account information issued to a user of the multifunction peripheral 10A. The control program 65 requires an HTML file defining the login page of the relaying apparatus 80 via the communication interface 55, receive the replied HTML file from the relaying apparatus 80 in response to the request, and displays the login page according to the received HTML file.

FIG. 9(A) shows an example of the login page. As shown in FIG. 9(A), the login page includes a message "Please input user ID and password and press "login" button", a text box 121 for displaying an inputted user ID, a text box 122 for displaying an inputted password, and a "login" icon 123.

In S12, the control program 65 receives, through the operation interface 54, a user's input operation of the user ID and the password, and a user's operation selecting the "login" icon 123. Hereinafter, the user ID and the password are referred to as the first account information.

In S13 the control program 65 transmits login request information to the relaying apparatus 80 via communication interface 55 in response to the first account information and selection of the "login" icon 123. The login request information is for requiring the information processing terminal 50 to be a login state. In other words, the login request information requests to transmit the session ID. The login request information includes the first account information received in S12.

In S13 the control program 95 of the relaying apparatus 80 receives the login request information from the information processing terminal 50 via the communication interface 85. The control program 95 checks whether the account list (FIG. 4(A)) includes an account record having the first account information included in the login request information. In response to confirming that the account record is recorded in the account list, the control program 95 issues the session ID, and registers the session ID in the account record.

In S14 the control program 95 transmits an HTML file defining a menu page and the issued session ID to the information processing terminal 50 via the communication interface 85. On the other hand, in response to confirming absence of the account record in the account list, the control program 95 transmits error information to the information processing terminal 50 via the communication interface 85 (this process is not shown in the drawings).

In S14 the control program 65 receives the HTML file and the session ID from the relaying apparatus 80 via the communication interface 55. The control program 65 temporarily stores the received session ID in the data storage area 62B. In S15 the control program 65 displays the menu page on the display 53 according to the received HTML file. FIG. 9(B) is an example of the menu page. As shown in FIG. 9(B), the menu page includes a "PIN issuance" icon 125, a "service application" icon 126, and an "ID replacement" icon 127.

Steps S15, S41 (FIG. 6), and S91 (FIG. 8) are processes for displaying the menu page on the display 53. The same process is performed in each of steps S15, S41, and S91. After the menu page is displayed on the display 53 (S15, S41, or S91), the process advances to S17 in a case where the control program 65 receives selection of the "PIN issuance" icon 125 via the operation interface 54 (S16), the process advances to S43 in a case where the control program 65 receives selection of "service application" icon 126 (S42), and the process advances to S93 in a case where the control program 65 receives selection of the "ID replacement" icon 127 (S92).

In S17 the control program 65 transmits PIN request information to the relaying apparatus 80 via the communication interface 55 in response to selection of the "PIN issuance" icon 125 (S16). The PIN request information is for requesting, to the relaying apparatus 80, issuance of a PIN associated to the first account information transmitted in S13. The PIN request information includes the session ID received in S14.

In S17 the control program 95 receives the PIN request information from the information processing terminal 50 via the communication interface 85. In S18 the control program 95 issues the PIN. In S19 the control program 95 registers the issued PIN in the account record that has the session ID received in S17. In S20 the control program 95 transmits display instruction information to the information processing terminal 50 via the communication interface 85. The display instruction information is an HTML file defining a PIN display page. The display instruction information includes the PIN issued in S18.

After the prescribed time period is elapsed from a time at which the relaying apparatus 80 issued the session ID, the relaying apparatus 80 deletes the session ID from the data storage area 92B (the account list). When the session ID included in the PIN request information is not stored in the relaying apparatus 80 (the data storage area 92B), that is, when the control program 95 deleted the session ID from the data storage area 92B, the control program 95 transmits the HTML file defining the login page. The control program 95 may transmit an HTML file defining a notification page for notifying that the expiration of time of the session ID is expired before transmitting the HTML file defining the login page to the information processing terminal 50. Accordingly, the login page is displayed on the display 53 after the notification page is displayed on the display 53.

In S20 the control program 65 receives the display instruction information from the relaying apparatus 80 via the communication interface 55. In S21 the control program 65 displays the PIN display page on the display 53 according to the display instruction information. FIG. 10(A) is an example of the PIN display information. As shown in FIG. 10(A), the PIN display information includes a message "please input displayed PIN into multifunction peripheral through which you use service", and PIN "012" that is issued in S18.

The PIN display page may further include an "OK" icon, and an "end" icon. The "OK" icon corresponds to an instruction to continue the session. The "end" icon corresponds to an instruction to end the session. The control program 65 may transmit, to the relaying apparatus 80 via the communication interface 55, session continuation information for indicating continuation of the session in response to selection of the "OK" icon through the operation interface 54. On the other hand, the control program 65 may transmit, to the relaying apparatus 80 via the communication interface 55, session end information in response to selection of the "end" icon through the operation interface 54.

The control program 95 may transmit the HTML file defining the menu page to the information processing terminal 50 via the communication interface 85 in response to the session continuation information from the information processing terminal 50 via the communication interface 85. Accordingly, the menu page shown in FIG. 9(B) is displayed on the display 53. The control program 95 may further transmit an HTML file defining another page for displaying the another page on the display 53 before displaying the menu page on the display 53. On the other hand, the control program 95 may end the session in response to the session end information from the information processing terminal 50 via the communication interface 85.

In S22, the control program 35 of the multifunction peripheral 10A displays a PIN input page on the display 23 in response to reception of a prescribed operation by the user who checks the PIN display page through the operation interface 24. FIG. 10(B) is an example of the PIN input page. As shown in FIG. 10(B), the PIN input page includes a message "please input PIN", a text box 131 displaying the inputted PIN, and a "transmission" icon 132. The control program 35 receives, through the operation interface 24, a user's operation to input PIN and a user's operation to select the "transmission" icon 132 (S23).

In S23 the control program 35 receives the input of the PIN "012" that is displayed on the display 53 and selection of the "transmission" icon 132 through the operation interface 24. In S24 the control program 35 transmits, to the relaying apparatus 80 via the communication interface 25, first registration request information in response to the input of the PIN "012" and the selection of the "transmission" icon 132. The first registration request information is for requesting, to the relaying apparatus 80, registration of the device record of the multifunction peripheral 10A. The first registration request information includes the device information of the multifunction peripheral 10A.

In S24 the control program 95 receives the first registration request information from the multifunction peripheral 10A via the communication interface 85. In S25 the control program 95 registers, in the device list (FIG. 4(B)), a device record including the device information received in S24. Here, the device record registered in S25 does not have the account ID, the second device ID, and the first token, and has the connection information indicating "Disconnect". In S26, the control program 95 transmits registration completion information to the multifunction peripheral 10A via the communication interface 85. The registration completion information is for indicating that registration of the device record is completed.

In S26 the control program 35 receives the registration completion information from the relaying apparatus 80 via the communication interface 25. In S27 the control program 35 transmits first token request information to the relaying apparatus 80 via the communication interface 25. The first token request information is for requesting issuance of the first token to the relaying apparatus 80. The first token request information includes the first device ID included in the device information and the PIN that is received in S23.

In S27 the control program 95 receives the first token request information from the multifunction peripheral 10A via the communication interface 85. In S28 the control program 95 issues a first token. The control program 95 reads the account record including the PIN received in S27 from the account list (FIG. 4(A)). In S29 the control program 95 registers, in the device record identified by the first device ID received in S27, the first token issued in S28 and the account ID included the read account record. In S30 the control program 95 transmits the first token issued in S28 to the multifunction peripheral 10A via the communication interface 85.

The first token is information for further indicating possession of authority to allow the relaying apparatus 80 to perform server push using XMPP. The server push can be performed from the relaying apparatus 80 to the multifunction peripheral 10A by transmitting XMPP connection permission information including the first token from the multifunction peripheral 10A to the relaying apparatus 80.

The processes S24 and S27 may be unified in one communication process. That is, the processes S24 and S27 are performed at a time. In this case the processes S25 and S29 are performed at a time. The control program 95 transmits error information to the multifunction peripheral 10A via the communication interface 85 without performing S28 and S29 in response to confirming non-existence of the account record including the PIN received in S27.

In S30 the control program 35 receives the first token from the relaying apparatus 80 via the communication interface 25. The control program 35 stores the first token received in S30 in the data storage area 32B. In S31 the control program 35 transmits the XMPP connection permission information to the relaying apparatus 80 via the communication interface 25. The XMPP connection permission information is an example of server push permission information for permitting transmission of information from the relaying apparatus 80 to the multifunction peripheral 10A via server push. The XMPP connection permission information includes the first token received in S30.

In S31 the control program 95 receives the XMPP connection permission information from the multifunction peripheral 10A via the communication interface 85. The control program 95 adds the connection information to the device record having the first token received in S31. Here, the connection information added to the device record is for transmitting information to the multifunction peripheral 10 that is transmission source of the XMPP connection permission information. The connection information may include: IP address of the connection source included in IP header of the XMPP connection permission information; and a port number of the connection source included in TCP header of the XMPP connection permission information. Accordingly, the XMPP connection is established between the multifunction peripheral 10A and the relaying apparatus 80.

The process S31 is performed according to procedure based on XMPP over BOSH (XMPP over Bidirectional-Streams Over Synchronous HTTP). An XMPP server may intervene between the multifunction peripheral 10A and the relaying apparatus 80. The XMPP over BOSH is a protocol that maintains a connection established state at all the time. A protocol that establishes connection between the multifunction peripheral 10A and the relaying apparatus 80 is not limited to the XMPP over BOSH. The protocol may be one of a number of protocols known as connection-establishing protocols, continuous connection protocols, or connection-maintaining protocols. Note that the XMPP connection permission information for XMPP Over BOSH is transmitted as an HTTP request in the hierarchy of HTTP.

The XMPP connection is for transmission of a request from the relaying apparatus 80 to the multifunction peripheral 10A via the router 102A. This transmission of the request is so called "push notification". An XMPP request indicates a request from an apparatus on the Internet to a machine within LAN via the router 102A. A push notification and a push transmission indicates transmission of request from the relaying apparatus 80 to the multifunction peripheral 10A. A server push indicates transmitting a request from the relaying apparatus 80 as an HTTP server to the multifunction peripheral 10A.

The XMPP connection is disconnected after a prescribed connection maintaining time period is elapsed. The control program 35 establishes XMPP connection to the relaying apparatus 80 again when a re-connection time period is elapsed. Here, the re-connection time period is shorter than the prescribed connection maintaining time period. Accordingly, the control program 95 can transmit any data at arbitrary time to the multifunction peripheral 10A by using recently established XMPP connection.

Figure 6:
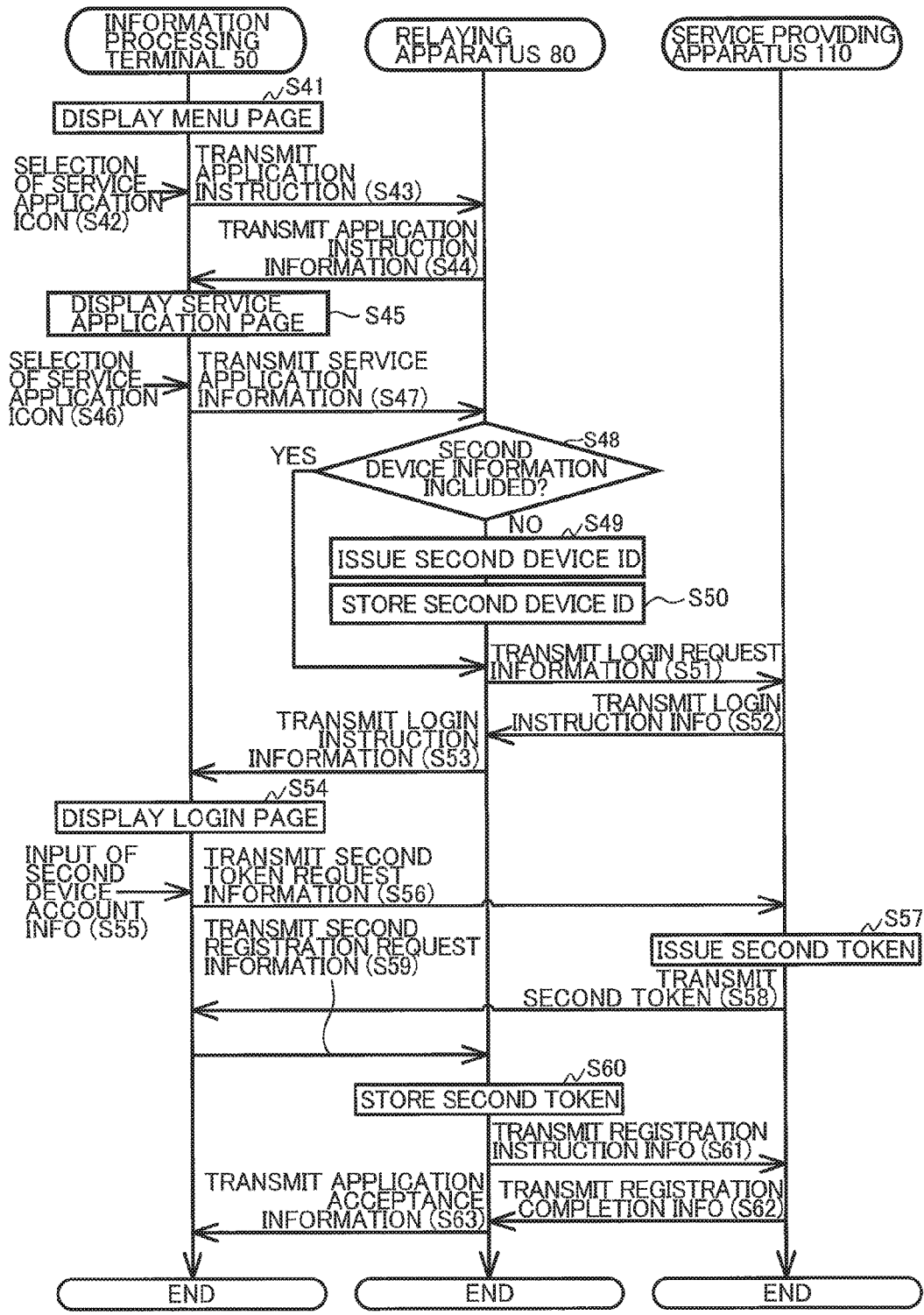
FIG. 6 is a flowchart illustrating a process for registering a service record in the relaying apparatus and a process for registering a second device ID in the service-providing apparatus.

FIG. 6 shows a process for registering a service record of a service that a user uses through the multifunction peripheral 10A and registering the second device ID identifying the multifunction peripheral 10A in the service-providing apparatus 110. The process shown in FIG. 5 is performed before performing the process shown in FIG. 6.

In S41 (or S15) the control program 65 of the information processing terminal 50 displays the menu page on the display 53. The procedures for displaying the menu page transmits the same the processes S11-S15 shown in FIG. 5. In S43 the control program 65 application information to the relaying apparatus 80 via the communication interface 55 in response to selection of the "service application" icon 126 via the operation interface 54 (S42). The application information is for requesting, to the relaying apparatus 80, a list of services that can be used via the multifunction peripherals 10A and 10B. The application information includes the session ID received in the login process (S11-S14).

In S43 the control program 95 of the relaying apparatus 80 receives application information from the information processing terminal 50 via the communication interface 85. In S44 the control program 95 transmits application instruction information to the information processing terminal 50 via the communication interface 85. The application instruction information is for instructing selection of service that is used through the multifunction peripheral 10A or 10B. The application instruction information is an HTML file defining a service application page for example.

Specifically, the control program 95 reads the account record including the session ID received in S43 from the account list (FIG. 4(A)). The control program 95 reads the device record including the account ID that is included in the read account record from the device list (FIG. 4(B)). The control program 95 reads, from the service list (FIG. 4(C)), the service record(s) including the second device ID that is included in the read device record. The control program 95 reads, from the service list (FIG. 4(C)), the service ID associated to the model name included in the read device record. The control program 95 generates the HTML file defining the service application page using the read information described above.

In S44 the control program 65 receives the application instruction information from the relaying apparatus 80 via the communication interface 55. In S45 the control program 65 displays the service application page on the display 53 according to the application instruction information. FIG. 11(A) is an example of the service application page. As shown in FIG. 11(A), the service application page includes the device names and model names of the multifunction peripherals 10A and 10B, the icons 135, 136, 137, and 138. In S46 the control program 65 receives a user's operation for selecting the icons 135-138 through the operation interface 54.

The icons 135-138 indicate whether services are available via the respective multifunction peripherals 10A and 10B and whether the use of each service is applied. The application icons 135 and 137 indicate that the service A is available via the respective multifunction peripherals 10A and 10B and that use of the service A has not been applied. The unsupported icon 136 indicates that the service B is unavailable through the multifunction peripheral 10A. The applied icon 138 indicates the service B is available through the multifunction peripheral 10B and that use of the service B has been applied. The unsupported icon 136 and the applied icon 138 are graying out showing that the icons 136 and 138 cannot be selected.

In S47 the control program 65 transmits service application information to the relaying apparatus 80 via the communication interface 55 in response to selection of the application icon 135 (for example) via the operation interface 54 (S46). The service application information is for applying use of the service A via the multifunction peripheral 10A corresponding to the application icon 135. The service application information includes the session ID received through the login process (S11-S14), the first device ID "abc" of the multifunction peripheral 10A corresponding to the application icon 135, and the service ID "service A" corresponding to the application icon 135.

In S47 the control program 95 receives the service application information from the information processing terminal 50 via the communication interface 85. In S48 the control program 95 determines whether the second device ID is included in the device record identified by the first device ID received in S47.

In S49 the control program 95 issues the second device ID in response to determining that the second device ID is not included in the record (S48: NO). In S50 the control program 95 adds the second device ID issued in S49 to the device record identified by the first device ID received in S47. On the other hand the control program 95 skips S49 and S50 and advances to S51 in response to determining that the second device ID is included in the record (S48: YES).

In S51 the control program 95 transmits, via the communication interface 85, login request information to the service-providing apparatus 110 providing a service identified by the service ID "service A" received in S47. The login request information is for requesting execution of a login process using the second account information to the service-providing apparatus 110. In other words, the login request information requests an HTML file defining a login page for inputting the second account information.

In S52 the control program 95 receives login instruction information from the service-providing apparatus 110 via the communication interface 85. The login instruction information is an HTML file defining the login page, for example. In S53 the control program 95 transmits the login instruction information received in S52 to the information processing terminal 50 via the communication interface 85. The control program 95 adds a redirect URL to the login instruction information transmitted in S53. The redirect URL is information indicating transmission destination of the second token. The control program 95 may stores the first device ID included in the service application information in association with the redirect URL in the storage 92.

In S53 the control program 65 receives the login instruction information from the relaying apparatus 80 via the communication interface 55 via the communication interface 55. In S54 the control program 65 displays the login page on the display 53 on the basis of the login instruction information. In S55 the control program 65 accepts an user's operation to input the second account information and a user's operation to select the "login" icon 123 via the operation interface 54. The login page is basically the same as that shown in FIG. 9(A), for example. However, the login page displayed in S54 is for receiving input of the second account information issued to the user of the multifunction peripheral 10.

When in S55 the control program 65 receives the input of the second account information and the selection of the "login" icon 123 via the operation interface 54, in S56 the control program 65 transmits second token request information to the service-providing apparatus 110 via the communication interface 55. The second token request information is for requesting issuance of the second token to the service-providing apparatus 110. The second token request information includes the second account information received in S55. In response to the second token request information, in S57 the service-providing apparatus 110 issues a second token, and transmits the second token to the information processing terminal 50. In S58 the control program 65 receives the issued second token from the service-providing apparatus 110 via the communication interface 55.

In S59 the control program 65 transmits second registration request information to the relaying apparatus 80 designated by the redirect URL received in S53 via the communication interface 55. The second registration request information is for requesting the relaying apparatus 80 to register the second device ID corresponding to the multifunction peripheral 10A into the service-providing apparatus 110. The second registration request information includes the session ID received through the login process (S11-S14), the first device ID that is the same as the first device ID transmitted in S47, and the second token received in S58. In the case where the relaying apparatus 80 stores the first device ID included in the service application information in association with the redirect URL, the second registration request information may not include the first device ID.

In S59 the control program 95 receives the second registration request information from the information processing terminal 50 via the communication interface 85. The control program 95 reads a device record identified by the first device ID received in S59 from the device list. The control program 95 adds a new service record to the service list. The new service records includes the second device ID included in the read device list, the service ID received in S47, the second token received in S59.

In S61 the control program 95 transmits a registration instruction information to the service-providing apparatus 110 via the communication interface 85. The registration instruction information is for instructing to register the second device ID of the multifunction peripheral 10A in association with the service ID of the service that is to be used via the multifunction peripheral 10A. The registration instruction information includes information included in the newly added service record, that is, the second device ID, the service ID, and the second token.

The service-providing apparatus 110 performs the registration on the basis of the registration instruction information and then transmits registration completion information. The registration completion information is for indicating that each information included in the registration instruction information is registered in association with each other. In S62 the control program 95 receives the registration completion information from the service-providing apparatus 110 via the communication interface 85. In S63 the control program 95 transmits application acceptance information to the information processing terminal 50 via the communication interface 85. The application acceptance information is for indicating that the service A is available via the multifunction peripheral 10A. In S63 the control program 65 receives the application acceptance information from the relaying apparatus 80 via the communication interface 85.

Though not shown in the drawings, the application acceptance information may be an HTML file defining a notification page. In response to the application acceptance information from the relaying apparatus 80 via the communication interface 55 in S63, the control program 65 may display the notification page on the display 53 on the basis of the application acceptance information. The notification page is for notifying the user of the fact that the service A is available via the multifunction peripheral 10A. The notification page may include an "OK" icon and an "end" icon similarly to the PIN display page. In response to selection of the "OK" icon, the menu page may be displayed on the display 53, and in response to selection of the "end" icon, session may be ended, similarly to the PIN display page.

Figure 7:
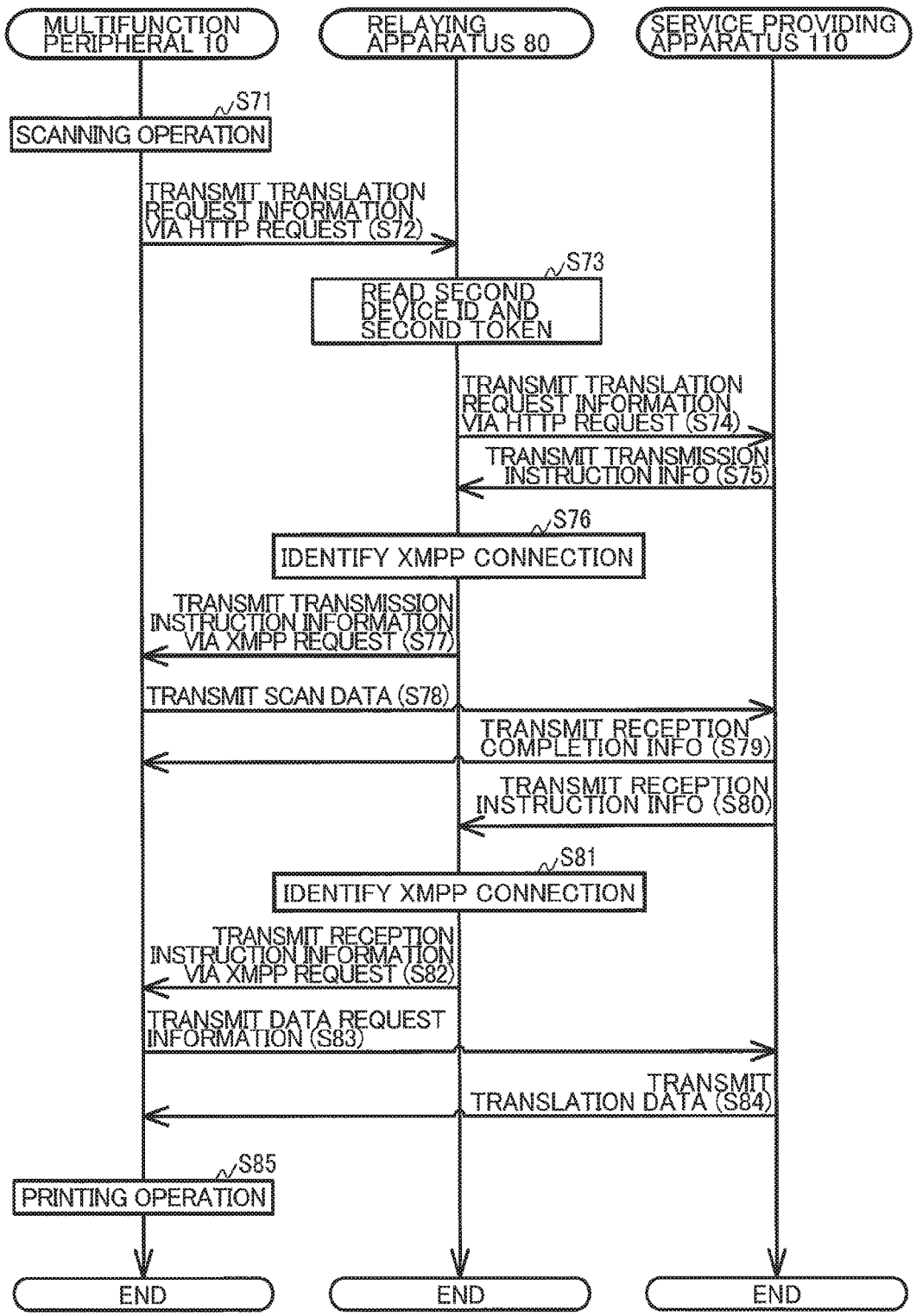
FIG. 7 is a flowchart illustrating a process for using a translation service by the service-providing apparatus via the multifunction peripheral.

FIG. 7 shows a process for using a translation service provided by the service-providing apparatus 110 via the multifunction peripheral 10A. The processes shown in FIGS. 5 and 6 has been performed prior to the process shown in FIG. 7.

In S71 the control program 35 of the multifunction peripheral 10A controls the scanner 12 to perform a scanning operation. The scanner 12 generates image data representing an image by reading an image recorded on the original sheet set on an contact glass (not shown) or an ADF (Automatic Document Feeder) (not shown). The original sheet includes a character string written in a first language.

In S72 the control program 35 transmits translation request information as an HTTP request to the relaying apparatus 80 via the communication interface 25. The translation request information is an example of service use information for using the translation service provided by the service-providing apparatus 110. The translation request information includes the service ID identifying the translation service, the first device ID identifying the multifunction peripheral 10A, and the first token received in S30, for example. The service ID included in the translation request information is an example of service request information for requesting the translation service provided by the service-providing apparatus 110.

In S72 the control program 95 of the relaying apparatus 80 receives the translation request information from the multifunction peripheral 10A via the communication interface 85. Though not shown in the drawings, the control program 95 transmits reception completion information as an HTTP response to the multifunction peripheral 10A via the communication interface 85. Here, the reception completion information is for example "ACK (Acknowledgement)" indicating reception of the translation request information. In S73 the control program 95 reads a device record identified by the first device ID received in S72 from the device list (FIG. 4(B)). Further, the control program 95 reads a service record identified by the second device ID included in the read device record, and the service ID received in S72 from the service list (FIG. 4(C)).

In S74 the control program 95 transmits the translation request information as an HTTP request to the service-providing apparatus 110 via the communication interface 85. The translation request information transmitted to the service-providing apparatus 110 in S74 is information by modifying the translation request information received from multifunction peripheral 10A in S72 so that the first device ID is replaced to the second device ID included in the device record read in S73 and the first token is replaced to the second token included in the service record read in S73. The control program 95 may temporarily store a port number in association with the first device ID received in S72 in the data storage area 92B. Here, the stored port number indicates the TCP port from which the HTTP request including the translation request information has been received.

In S75 the service-providing apparatus 110 transmits transmission instruction information to the relaying apparatus 80. In S75 the control program 95 receives transmission instruction information from the service-providing apparatus 110 via the communication interface 85. The transmission instruction information is an example of service use information for instructing transmission of image data including a character string subject for the translation. For example, the transmission instruction information includes transmission destination URL indicating destination of the transmission of the image data, and the second device ID transmitted in S74. The transmission destination URL is an example of service information indicating the service that the service-providing apparatus 110 provides.

In S76 the control program 95 specifies the multifunction peripheral 10A identified by the second device ID received in S75, that is, specifies the information required for communications with the multifunction peripheral 10A. For example, the control program 95 reads a device record including the second device ID received in S75 from the device list (FIG. 4(B)). The control program 95 specifies XMPP connection established to the multifunction peripheral 10A identified by the first device ID included in the read device record. That is, the control program 95 specifies the IP address and the port number specified by connection information in the read device record (FIG. 4(B)).

In S76 the control program 95 transmits, to the multifunction peripheral 10A via the communication interface 85, the transmission instruction information as an XMPP request on the basis of the connection information of the multifunction peripheral 10A specified in S76. Specifically, the control program 95 performs server push for transmitting, to the IP address and the port number specified in S76, the transmission instruction information that is a response from the service-providing apparatus 110. The transmission instruction information transmitted in S77 to the multifunction peripheral 10A is the same as the transmission instruction information received from the service-providing apparatus 110 in S75 except that the second device ID is deleted in the information transmitted in S77.

In S77 the control program 35 receives the transmission instruction information from the relaying apparatus 80 via the communication interface 25. Though not shown in the drawings, the control program 35 transmits reception completion information as an XMPP response to the relaying apparatus 80 via the communication interface 25. Here, the reception completion information is for indicating that the transmission instruction information has been received. In S78 the control program 35 transmits scan data to the service-providing apparatus 110 that is designated by the transmission destination URL received in S77 via the communication interface 25. The scan data is the image data generated by the scanner 12 in S71. In S78 the service-providing apparatus 110 receives the scan data from the multifunction peripheral 10, and in S79 transmits reception completion information. In S79 the control program 35 receives the reception completion information from the service-providing apparatus 110 via the communication interface 25. The reception completion information is for indicating that the scan data subject to the translation service has been received.

In S80 the service-providing apparatus 110 transmits reception instruction information to the relaying apparatus 80. In S80 the control program 95 receives the reception instruction information from the service-providing apparatus 110 via the communication interface 85. The reception instruction information is an example of service use information for instructing reception of translation data. The reception instruction information includes reception source URL indicating a location of the translation data, the second device ID transmitted in S74. The service-providing apparatus 110 transmits the reception instruction information when the translation of the character string written in the first language into a character string written in a second language has been completed.

In S81 the control program 95 performs a specification process for specifying the second device ID received in S75. For example, in S81 the control program 85 specifies the information required for communications with the multifunction peripheral 10A similarly to S76. In S82 the control program 95 transmits, as an XMPP request, reception instruction information to the multifunction peripheral 10A specified in the specification process via the communication interface 85. The reception instruction information transmitted in S82 to the multifunction peripheral 10A is basically the same as the reception instruction information received from the service-providing apparatus 110 in S80 except that the second device ID is deleted in the information transmitted in S82. That is, the control program 95 transmits through the established XMPP connection the transmission instruction information (S77) and the reception instruction information (S82) to the multifunction peripheral 10A which is the transmission source of the translation request information.

In S82 the control program 35 receives the reception instruction information from the relaying apparatus 80 via the communication interface 25. Though not shown in the drawings, the control program 35 transmits, as an XMPP response, reception completion information for indicating that the transmission instruction information has been received to the relaying apparatus 80 via the communication interface 25. In S83 the control program 35 transmits data request information to the service-providing apparatus 110 via the communication interface 25. The data request information is for requesting the translation data designated by the reception source URL received in S82.

In S83 the service-providing apparatus 110 receives the data request information from the multifunction peripheral 10, and in S84 transmits translation data to the multifunction peripheral 10. In S84 the control program 35 receives the translation data from the service-providing apparatus 110 via the communication interface 25. The translation data represents a result of the translation of the string character written in the first language into the string character written in the second language, for example. The translation data is image data including the string character written in the second language. The control program 35 controls the printer 11 to perform the print operation to print the translation data received in S84. That is, the image represented by the translation data is recorded on the recording sheet.

Figure 8:
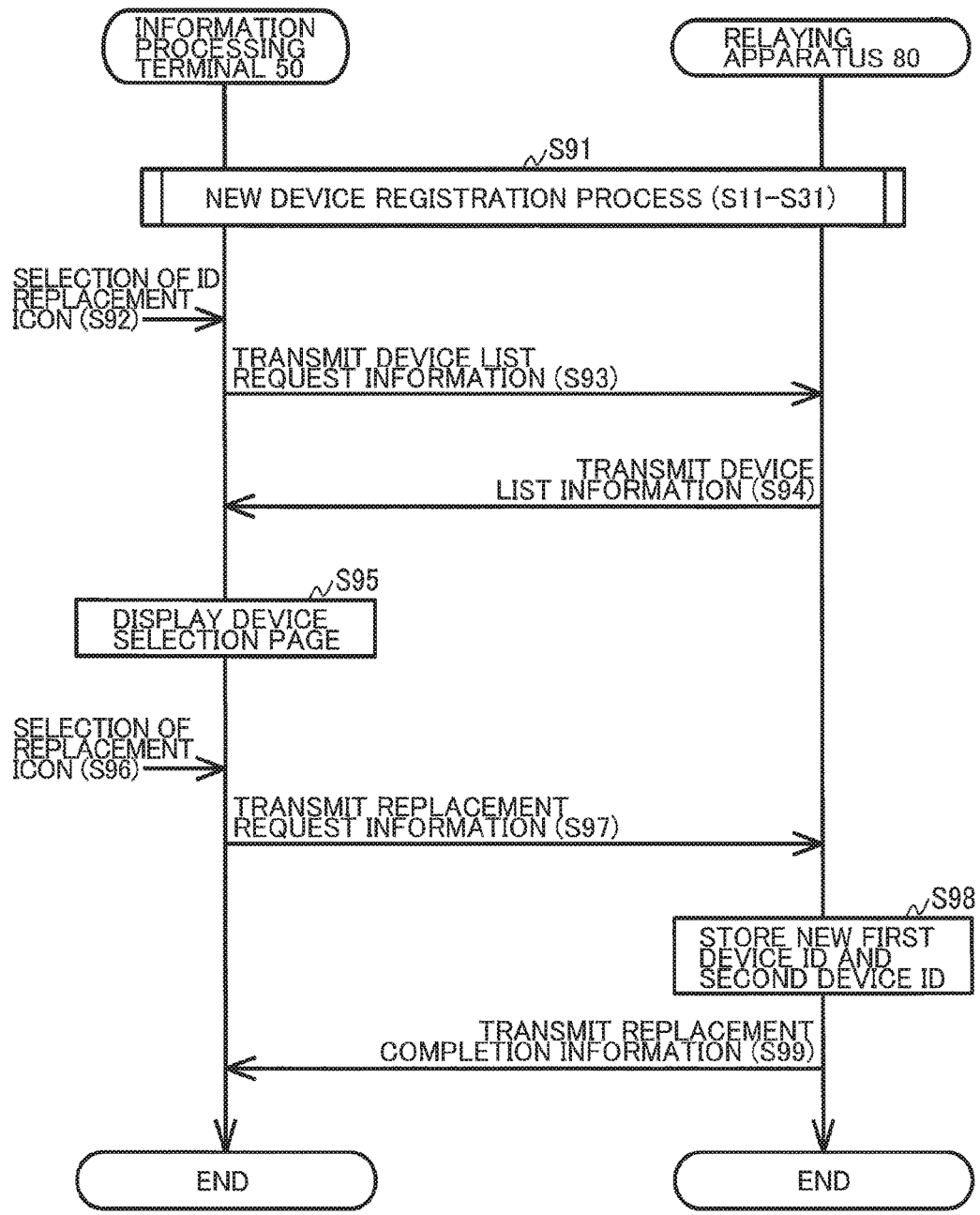
FIG. 8 is a flowchart illustrating a process for replacing the first device ID registered in the relaying apparatus.
Figure 9:
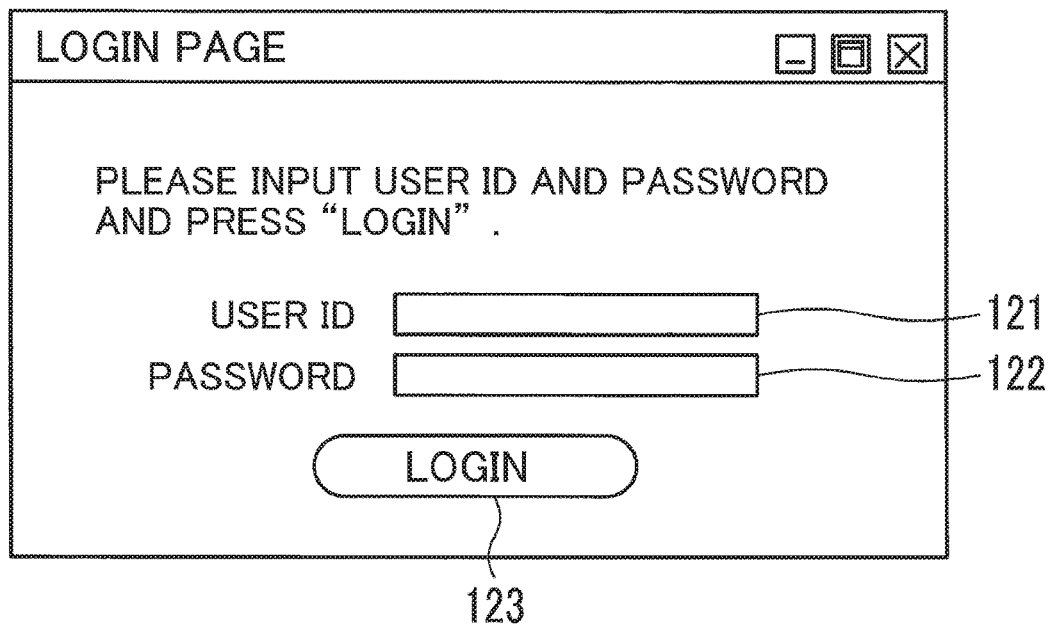
FIG. 9(A) is an example of a login page displayed on a display of the information processing terminal.
FIG. 9(B) is an example of a PIN input page displayed on the display of the information processing terminal.
Figure 9:
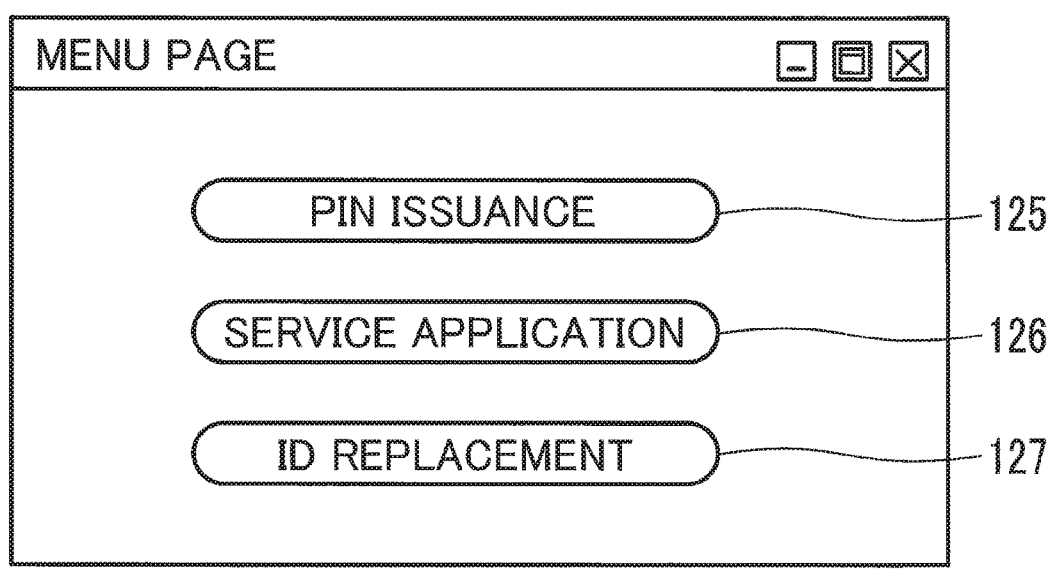
Figure 10:
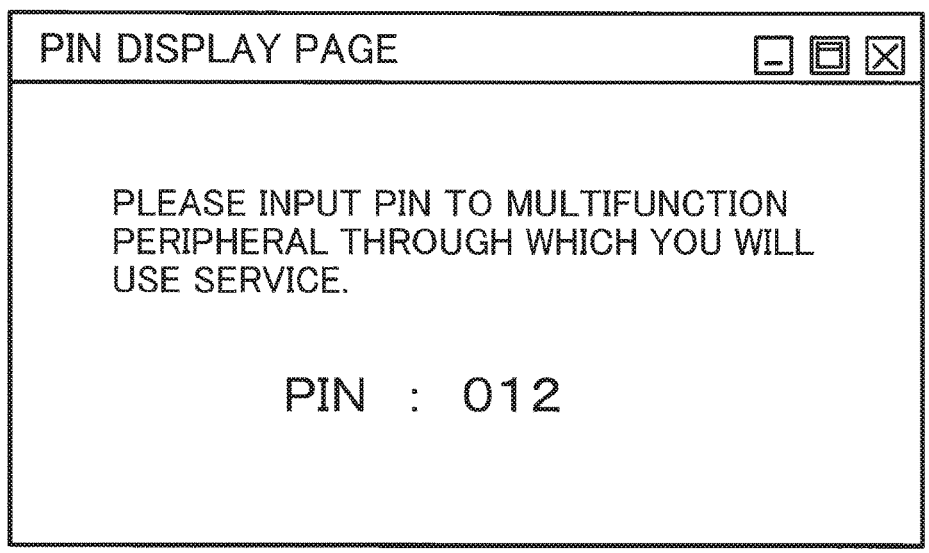
FIG. 10(A) is an example of a PIN display page displayed on the display of the information processing terminal.
FIG. 10(B) is an example of a PIN input page displayed on a display of the multifunction peripheral.
Figure 10:
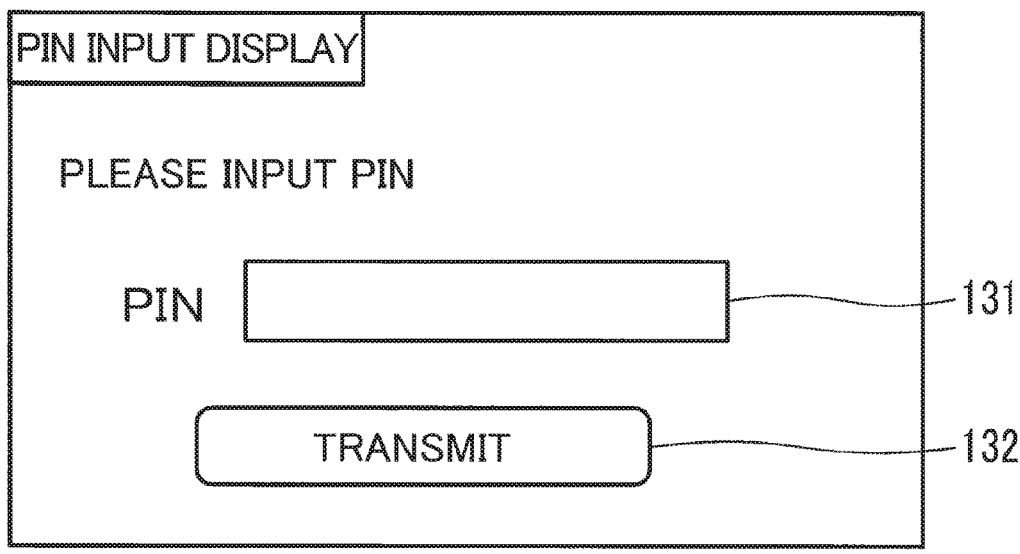

FIG. 8 shows a process for replacing the first device ID registered in the relaying apparatus 80. The process shown in FIG. 8 may be performed by a user of one of the multifunction peripherals 10A and 10B, or a service man of the manufacturer of the multifunction peripheral 10.

In S91 steps the same as steps S15-S31 shown in FIG. 5 are performed by the user or the service man, and then a new multifunction peripheral 10C is registered in the relaying apparatus 80. In the embodiment, a device record including a first device ID "ghi", a device name "printer 3", a model name "MFP-B", a first token "0x4B7D", an account ID "001" are added to the device list through steps S15-S31. Hereinafter, the multifunction peripheral 10 identified by the first device ID "ghi" is referred to as "the multifunction peripheral 10C".

In S91 the control program 65 of the information processing terminal 50 displays the menu page shown in FIG. 9(B). That is, this display process is the same as step S15. When in S92 the control program 65 receives selection operation of the "ID replace" icon 127 via the operation interface 54, in S93 the control program 65 transmits device list request information to the relaying apparatus 80 via the communication interface 55. The device list request information is for requesting transmission of device records associated to the user possessing the multifunction peripheral 10A, 10B, and 10C. The device list request information includes the session ID received in the login process (S11-S14).

In S93 the control program 95 of the relaying apparatus 80 receives the device list request information from the information processing terminal 50 via the communication interface 85. The control program 95 reads an account record including the session ID received in S92 from the account list (FIG. 4(A)). Further, the control program 95 reads, from the device list (FIG. 4(B)), all the device records including the account ID that identifies the read account record. The control program 95 reads, from the service list (FIG. 4(C)), service records including one of the second IDs included in the read device records.

In S94 the control program 95 transmits device list information to the information processing terminal 50 via the communication interface 85. The device list information is for prompting the user or the service man to select an old first device ID and a new first device ID from among a plurality of first device IDs. The device list information is an HTML file defining a device selection page. The control program 95 generates the HTML file defining the device selection page on the basis of the read device record(s) and the read service record(s).

In S94 the control program 65 receives the device list information from the relaying apparatus 80 via the communication interface 55. In S95 the control program 65 displays the device selection page on the display 53 according to the device list information received in S94. In S96 the control program 65 receives a user's operation on the device selection page via the operation interface 54.

FIG. 11(B) shows one example of the device selection page. The device selection page includes a device name, a model name, an available service, a connection status of XMPP connection, and two radio buttons for each of the multifunction peripherals 10A-10C. The left radio buttons are for designating one old first device ID from among the device IDs of the respective multifunction peripherals 10. The right radio buttons are for designating one new first device ID from among the device IDs of the respective multifunction peripherals 10. The device selection page further includes a "replace" icon 141, and a "cancel" icon 142. The "replace" icon 141 corresponds to an instruction for instructing the relaying apparatus 80 to perform a replacement process. The "cancel" icon 142 corresponds to an instruction not to perform the replacement process. The available service is a service specified by the service ID in the service record read in S94. The connection status is based on the connection information in the device record read in S94.

When in S96 the control program 65 receives selection of both the left and right radio buttons, and selection of the "replace" icon 141 via the operation interface 54, the control program 65 transmits replacement request information to the relaying apparatus 80 via the communication interface 55. The replacement request information is for requesting to assign the second device information ID that is assigned to the old first device ID with the new first device ID. When the radio buttons are selected as shown in FIG. 11(B), the replacement request information includes the old first device ID "def" and the new first device ID "ghi".

In S97 the control program 95 receives the replacement request information from the information processing terminal 50 via the communication interface 85. In S98 the control program 95 reads a device record identified by the old first device ID and a device record identified by the new first device ID from the device list. The control program 95 adds the second device ID included in the device record identified by the old first device ID to the device record identified by the new first device ID and registers the modified device record identified by the new first device ID. The control program 95 deletes the device record identified by the old first device ID from the device list.

In S99 the control program 95 transmits replacement completion information to the information processing terminal 50 via the communication interface 85. The replacement completion information indicates that the replacement process has been completed according to the replacement request information. In S99 the control program 65 receives the replacement completion information from the relaying apparatus 80 via the communication interface 85.

Though not shown in the drawings, the replacement completion information may be an HTML file defining a replacement completion page. In response to the replacement completion information from the relaying apparatus 80 via the communication interface 55, in S99 the control program 65 may display the replacement completion page on the display 53 according to the replacement completion information. The replacement completion page is for notifying a user that the replacement process has been completed according to the replacement request information. The replacement completion page may include an "OK" icon and an "end" icon similarly to the PIN display page. In response to selection of the "OK" icon, the menu page may be displayed on the display 53, and in response to selection of the "end" icon, the session may be ended, similarly to the PIN display page.

Operational Advantages of the Embodiment

According to the embodiment, the first device ID associated with the second device ID is changed from the old first device ID to the new first device ID in the replacement process (S98). When the user intends to continue using the service B that was used through the multifunction peripheral 10B, it is not required to notify the service-providing apparatus 110 of the user's intention for replacing the first device ID associated with the second device ID. The relaying apparatus 80 relays communications between the multifunction peripheral 10C and the service-providing apparatus 110 using the new first device ID and the second device ID newly associated with each other. Accordingly, the user of the multifunction peripherals 10B and 10C can continue to use the service via the multifunction peripheral 10C, where the service was used via multifunction peripheral 10B.

That is, the relaying apparatus 80 can properly relays the service request information to the service-providing apparatus 110 from the multifunction peripheral 10B or 10C, and relay the service information from the service-providing apparatus 110 to the multifunction peripheral 10B or 10C before and after the replacement process. Accordingly, the user can continue to use the service via the multifunction peripheral 10C after the replacement process, where the service was used via multifunction peripheral 10B.

A method to update the device record in the replacement process is not limited to the above described example. For example, the control program 95 of the relaying apparatus 80 may overwrite a device record identified by the old first device ID so that the device record includes first device ID, a device name, a model name, and a first token included in a device record identified by the new first device ID. Further, the control program 95 may remove the device record identified by the new first device ID from the device list.

Alternatively, instead of deleting the device record identified by the old first device ID, the control program 95 may set a removal flag of the device record to ON so as to temporarily set the device record in disabled state. The control program 95 may set the removal flag to OFF by the user's instruction so as to set the device record in available state again. Accordingly, the multifunction peripheral 10 that uses the service can be easily changed from the multifunction peripheral 10B to the multifunction peripheral 10C and thereafter changed from the multifunction peripheral 10C to the multifunction peripheral 10B.

According to the embodiment, since the device record includes the account ID, the device records for the plurality of multifunction peripherals 10 that the user possesses can be extracted from the device list. The old first device ID and the new first device ID are selected through the device selection page generated on the basis of the device records associated with the account ID of the user. This configuration prevents the situation that first device ID of a multifunction peripheral 10 that a first user possesses is selected as the old first device ID, and first device ID of another multifunction peripheral 10 that a second user possesses is selected as the new first device ID.

The device selection page displays device names, model names, available services, connection statuses. The user can easily designate first device IDs of desired multifunction peripherals 10 as the old first device ID and the new first device ID. However, information displayed on the device selection page is not limited to these. For example, the device record may include arbitrary character strings for explaining each multifunction peripheral 10. In this case, the device selection page includes these character strings.

In the embodiment, the determination of whether the second device ID corresponding to the first device ID has already been issued before issuance of second device ID (S48). This configuration prevents duplication of the second IDs for one first device ID. The information processing terminal 50 that is transmission source of the application information acquires the second token (S85), and the second token is registered in the service-providing apparatus 110 together with the second device ID (S61). This configuration prevents from registering, in the service-providing apparatus 110, the second device ID of the multifunction peripheral 10 possessed by the user who has no right to use the service.

According to the embodiment, the transmission instruction information and the reception instruction information are transmitted from the relaying apparatus 80 to the service-providing apparatus 110 as server push using the XMPP connection. Even in a case where the translation process takes time in the service-providing apparatus 110, the reception instruction information can be properly relayed to the multifunction peripheral 10A protected by the firewall. Information that the relaying apparatus 80 transmits to the multifunction peripheral 10 using the XMPP connection is not limited to this example.

For example, in a case where the relaying apparatus 80 relays the status information collected in the multifunction peripheral 10 to the service-providing apparatus 110, the relaying apparatus 80 transmits subscribe information that is for instructing types of status information to be collected and transmission timing, using the XMPP connection. As another example, in a push type service for delivering news in the category that the user designated, the relaying apparatus 80 receives news data indicating news from the service-providing apparatus 110, and transmits the received news data to the multifunction peripheral 10 using the XMPP connection.

The process shown in FIG. 8 may be performed by the service man of the manufacturer of the multifunction peripheral 10 instead of the user of the multifunction peripheral 10. For example, when a control board of the multifunction peripheral 10B is replaced to new one due to malfunction of an old control board, the service man activates the process shown in FIG. 8. Before the control board is replaced to new one, the second device ID "β" was assigned to the first device ID "def" indicating the multifunction peripheral 10B. Through the process shown in FIG. 8, the second device ID "β" is newly associated with first device ID "ghi" indicating the multifunction peripheral 10C, that is, the multifunction peripheral 10B whose control board is replaced to new one. In the following, the process performed by the service man will explained focusing on the difference from the embodiment.

In S12 (S91) the control program 65 of the information processing terminal 50 receives input operation for the first account information of the administrator instead of the first account of the user. In S13 the control program 95 of the relaying apparatus 80 receives login request information including the first account information of the administrator from the information processing terminal 50 via the communication interface 85. In S14 the control program 95 transmits an HTML defining the menu page, and the session ID to the information processing terminal 50 via the communication interface 85.

Figure 12:
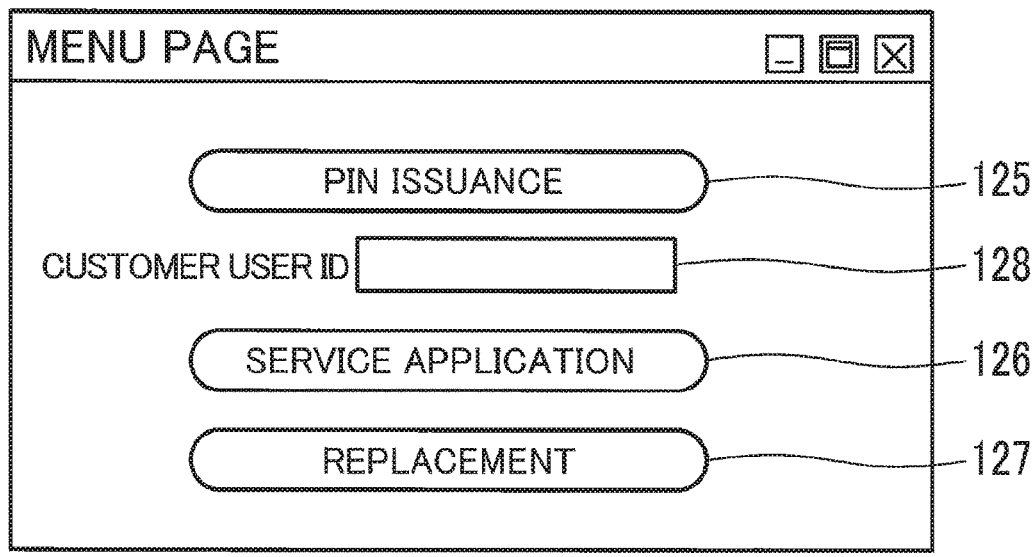
FIG. 12 is an example of a menu page for an administrator displayed on the display of the information processing terminal.

In S15 the control program 65 of the information processing terminal 50 displays the menu page on the display 53 on the basis of the HTML file received in S14. FIG. 12 is an example of the menu page for the administrator. The menu page shown in FIG. 12 is basically the same as the menu page shown in FIG. 9(B) except that the menu page shown in FIG. 12 includes a text box 128 for displaying a customer user ID. The customer user ID is a user ID included in the first user information of a user possessing the multifunction peripheral 10 that is to be registered in a new device registration process. The customer user ID is an example of the account identification information associated with the account ID.

In S16 the control program 65 receives an input operation of the customer's user ID and a selection operation of the "PIN issuance" icon 125 via the operation interface 54. In response to these operations, in S17 the control program 65 transmits PIN request information to the relaying apparatus 80 via the communication interface 55. The PIN request information is basically the same as the PIN request information transmitted in S17 of the above embodiment except that the PIN request information in this modification is further includes the customer user ID. In S19 the control program 95 of the relaying apparatus 80 adds the PIN issued in S18 to the account record that includes the customer user ID.

In S93 the control program 65 transmits device list request information to the relaying apparatus 80 via the communication interface 55. The device list request information is basically the same as the device list request information transmitted in S93 of the embodiment except that the device list request information in this modification further includes the customer user ID. The control program 95 of the relaying apparatus 80 reads an account record including the customer user ID received in S93 from the account list. Remaining processes are the same as those of the embodiment, and thus duplication explanations are omitted. According to the process in the modification, the service B can be used through the repaired multifunction peripheral 10B, that is the multifunction peripheral 10C, while the user needs not to perform complicated operations on the multifunction peripheral 10B.

The relaying apparatus 80 may be configured of a single apparatus, or a combination of a plurality of apparatuses. For example, the relaying apparatus 80 may include a first apparatus configured to communicate with the multifunction peripheral 10, a second apparatus configured to communicate with the information processing terminal 50, and a third apparatus configured to communicate with the service-providing apparatus 110. As another example, the relaying apparatus 80 may include a first apparatus configured to communicate with the multifunction peripheral 10, the information processing terminal 50, the service-providing apparatus 110 and perform each determination, and a second apparatus configured to store each set of information.

Processes performed by the controllers of the present disclosure are achieved by executing corresponding programs stored in the program storage areas 32A, 62A, and 92A by the respective CPUs 31, 61, and 91 in the multifunction peripheral 10, the information processing terminal 50, and the relaying apparatus 80. The configurations of the controllers are not limited to this. That is, at least part of each controller may be achieved by hardware, such as, Integrated Circuit (IC). Specifically, at least part of each controller may be achieved by may be a CPU, a plurality of CPUs, an Application Specific Integrated Circuit (ASIC), a plurality of ASICs, or any combination of these.

When all or part of the functions in the present disclosure are implemented by computer programs performed by the multifunction peripheral 10, the information processing terminal 50, and the relaying apparatus 80, the programs can be stored on a non-transitory computer-readable storage medium. The "non-transitory computer-readable storage medium" may be a portable medium, such as a memory card, CD-ROM, or DVD-ROM; storages mounted in a server to which the multifunction peripheral 10, the information processing terminal 50, and the relaying apparatus 80 can access, or an external storage device. The programs stored in the storage of the server may be provided as information or signals indicating the programs via the network such as the Internet.

What is claimed is:

1. A relaying apparatus comprising:
   a communication interface configured to communicate with an information processing terminal, a plurality of image processing apparatuses configured to process images, and a service-providing apparatus configured to provide a service available for a user of each of the plurality of image processing apparatuses;
   a storage storing a plurality of sets of first device information respectively identifying the plurality of image processing apparatuses, and second device information assigned to a first set of first device information from among the plurality of sets of first device information, the first set of first device information identifying one image processing apparatus from among the plurality of image processing apparatuses; and
   a controller configured to:
   communicate with the one image processing apparatus via the communication interface so as to transmit and receive first service use information, the first service use information being for using the service provided by the service-providing apparatus;
   communicate with the service-providing apparatus so as to transmit and receive second service use information via the communication interface, the second service use information including the second device information stored in the storage in association with the first set of first device information;
   receive replacement request information from the one information processing terminal via the communication interface, the replacement request information including old first device information and new first device information, the old first device information indicating the one image processing apparatus, the new first device information indicating another image processing apparatus other than the one image processing apparatus; and
   replace the first set of first device information so that the first set of first device information identifies the another image processing apparatus indicated by the new first device information instead of the one image processing apparatus indicated by the old first device information.

2. The relaying apparatus according to claim 1, wherein the controller is further configured to:
   issue first authentication information to indicate possession of authority to communicate with the service-providing apparatus; and
   store the issued first authentication in the storage in association with the first set of first device information,
   wherein the storage stores second authentication information in association with the second device information, the second authentication information being issued by the service-providing apparatus so as to indicate possession of authority to receive the service;
   wherein the controller is further configured to receive, from the one image processing apparatus, service request information, a second set of first device information, and the first authentication information, the service request information being for requesting to receive the service;
   read, from the storage, the second device information assigned to the received second set of first device information, and the second authentication information associated with the second device information; and
   transmit the service request information, the read second device information, and the read second authentication information to the service-providing apparatus via the communication interface.

3. The relaying apparatus according to claim 2, wherein the controller is further configured to:
   receive service application information from the information processing terminal via the communication interface, the service application information including a third set of first device information and service identification information for identifying the service;
   determine whether the storage stores the second device information assigned to the third set of first device information included in the service application information;
   issue another second device information in response to determining that the storage does not store the second device information assigned to the third set of first device information included in the service application; and
   store, in the storage, the third set of first device information included in the service application and the issued another second device information in association with each other,
   wherein the controller reads the another second device information instead of reading the second device information.

4. The relaying apparatus according to claim 3, wherein the controller does not store the another second device information when determining that the storage stores the second device information assigned to the third set of first device information included in the service application,
   wherein the controller reads, from the storage, the second device information that is determined to be assigned to the third set of first device information included in the service application.

5. The relaying apparatus according to claim 3, wherein the controller is further configured to:
- transmit acquisition instruction information to the information processing terminal via the communication interface, the acquisition instruction information being for instructing acquisition of the second authentication information to receive the service identified by the service identification information;
- receive registration request information from the information processing terminal via the communication interface, the registration request information being for requesting the service-providing apparatus to register the second device information, the registration request information including a fourth set of first device information and the second authentication information;
- store, in the storage, the service identification information indicated by the acquisition instruction information, and the second authentication information included in the registration request information in association with the second device information assigned to the fourth set of first device information included in the registration request information; and
- transmit registration instruction information to the service-providing apparatus via the communication interface, the registration instruction information being for instructing to register the second device information, the registration instruction information including the second device information assigned to the fourth set of first device information included in the registration request information and the second authentication information included in the registration request information.

6. The relaying apparatus according to claim 2 wherein the storage further stores account identification information identifying a user of at least one of the plurality of sets of image processing apparatuses, and provisional identification information assigned to the account identification information,
- wherein the controller is further configured to:
- transmit the provisional identification information to the information processing terminal via the communication interface;
- receive authentication request information from the image processing apparatus via the communication interface, the authentication request information being for requesting issuance of the first authentication information, the authentication request information including a fifth set of first device information and the provisional identification information, the controller issuing the first authentication information assigned with the fifth set of first device information in response to the authentication request information;
- store the account identification information assigned with the provisional identification information included in the authentication request information, the fifth set of first device information included in the authentication request information, and the issued first authentication information in the storage in association with each other; and
- transmit the issued first authentication information to the image processing apparatus identified by the fifth set of first device information included in the authentication request information.

7. The relaying apparatus according to claim 6, wherein the controller is further configured to:
- receive device list request information from the information processing apparatus via the communication interface, the device list request information including account specification information assigned to the account identification information; and
- transmit device list information to the information processing apparatus via the communication interface, the device list information including sets of first device information stored in the storage in association with the account identification information assigned with the account specification information,
- wherein each of the old first device information and the new first device information matches to one of the sets of first device information included in the device list information.

8. The relaying apparatus according to claim 1, wherein the controller is further configured to:
- receive service information and the second device information from the service-providing apparatus via the communication interface, the service information generated as a result of the service provided by the service-providing apparatus;
- identifying the one image processing apparatus identified by the first set of first device information assigned with the received second device information; and
- transmit the received service information to the image processing apparatus via the communication interface.

9. The relaying apparatus according to claim 8, wherein the communication interface is connected to the one image processing apparatus via firewall that protects network to which the one image processing apparatus belongs,
- wherein the controller is further configured to repeatedly receive server push acceptance information from the image processing apparatus via the communication interface at prescribed interval, the server push acceptance information being for accepting transmission of information via server push,
- wherein the controller transmits the service information to the image processing apparatus via the communication interface through the server push accepted by the server push acceptance information.

10. A system comprising a relaying apparatus, an information processing terminal, and a plurality of image processing apparatuses,
- wherein the relaying apparatus comprises:
- a first communication interface configured to communicate with the information processing terminal, the plurality of image processing apparatuses, and a service-providing apparatus configured to provide a service available for a user of each of the plurality of image processing apparatuses;
- a storage storing a plurality of sets of first device information respectively identifying the plurality of image processing apparatuses, and second device information assigned to a first set of first device information from among the plurality of sets of first device information, the first set of first device information identifying one image processing apparatus from among the plurality of image processing apparatuses; and
- a first controller configured to:
- communicate with the one image processing apparatus via the first communication interface so as to transmit and receive first service use information, the first service use information being for using the service provided by the service-providing apparatus;
- communicate with the service-providing apparatus so as to transmit and receive second service use information via the first communication interface, the second service use information including the second device information stored in the storage in association with the first set of first device information;

receive replacement request information from the information processing terminal via the first communication interface, the replacement request information including old first device information and new first device information, the old first device information indicating the one image processing apparatus, the new first device information indicating another image processing apparatus other than the one image processing apparatus; and replace the first set of first device information so that the first set of first device information identifies the another image processing apparatus indicated by the new first device information instead of the one image processing apparatus indicated by the old first device information, wherein the one image processing apparatus comprises:

an image processor configured to process an image;

a second communication interface configured to communicate with the relaying apparatus; and a second controller configured to communicate with the relaying apparatus via the second communication interface to transmit and receive the first service use information, wherein the information processing terminal comprises:

a third communication interface configured to communicate with the relaying apparatus;

a third controller configured to transmit the replacement request information to the relaying apparatus via the third communication interface.

11. The system according to claim 10, wherein the first controller is further configured to:

receive device list request information from the information processing apparatus via the first communication interface, the device list request information including account specification information assigned to account identification information; and transmit device list information to the information processing apparatus via the first communication interface, the device list information including sets of first device information stored in the storage in association with the account identification information assigned with the account specification information, wherein the information processing terminal further comprises an operation interface configured to receive a user's operation, wherein the third controller is further configured to:

transmit the device list request information to the relaying apparatus via the third communication interface;

receive the device list information from the relaying apparatus via the third communication interface;

receive, through the operation interface, a user's designation operation in which a set of first device information and another set of first device information are designated, as the old first device information and the new first device information respectively, from among the sets of first device information included in the device list information; and transmit the replacement request information including the designated old first device information and the designated new first device information to the relaying apparatus via the third communication interface.

* * * * *

UNITED STATES PATENT AND TRADEMARK OFFICE
CERTIFICATE OF CORRECTION

PATENT NO.         : 9,807,262 B2
APPLICATION NO.    : 15/200462
DATED              : October 31, 2017
INVENTOR(S)        : Kiyotaka Ohara et al.

Page 1 of 1

It is certified that error appears in the above-identified patent and that said Letters Patent is hereby corrected as shown below:

In the Claims

In Column 27, Claim 1, Lines 63-64:
Please delete "the one information" and insert --the information--

Signed and Sealed this
Thirty-first Day of July, 2018

Andrei Iancu
*Director of the United States Patent and Trademark Office*